(12) United States Patent
Jenkins et al.

(10) Patent No.: US 7,718,066 B2
(45) Date of Patent: May 18, 2010

(54) METHOD AND APPARATUS FOR CONTROLLING WASTEWATER TREATMENT PROCESSES

(75) Inventors: Thomas E. Jenkins, Glendale, WI (US);
David T. Redmon, Racine, WI (US);
Timothy D. Hilgart, Grafton, WI (US);
Juan De Dios Trillo Monsoriu,
Barcelona (ES); Ian Trillo Fox,
Barcelona (ES)

(73) Assignee: Advanced Aeration Control, LLC,
Racine, WI (US)

( * ) Notice: Subject to any disclaimer, the term of this patent is extended or adjusted under 35 U.S.C. 154(b) by 49 days.

(21) Appl. No.: 12/232,102

(22) Filed: Sep. 10, 2008

(65) Prior Publication Data
US 2009/0230055 A1   Sep. 17, 2009

Related U.S. Application Data

(63) Continuation of application No. 10/667,893, filed on Sep. 23, 2003, now Pat. No. 7,449,113.

(60) Provisional application No. 60/412,817, filed on Sep. 24, 2002, provisional application No. 60/479,150, filed on Jun. 18, 2003.

(51) Int. Cl.
*C02F 3/00* (2006.01)

(52) U.S. Cl. ............ 210/614; 210/620; 210/143; 210/150; 210/220

(58) Field of Classification Search ........... 210/614, 210/620–628, 143, 150–151, 220
See application file for complete search history.

(56) References Cited

U.S. PATENT DOCUMENTS 4,080,287 A * 3/1978 Conway et al. ............ 210/604

\* cited by examiner

*Primary Examiner*—Chester T Barry
(74) *Attorney, Agent, or Firm*—Westerman, Hattori, Daniels & Adrian, LLP

(57) ABSTRACT

Methods and apparatus for continuing, automated control of wastewater treatment processes. In certain preferred embodiments, method and apparatus for control of aeration in suspended growth biological treatment processes, especially in activated sludge processes.

20 Claims, 5 Drawing Sheets

METHOD AND APPARATUS FOR CONTROLLING WASTEWATER TREATMENT PROCESSES

CROSS-REFERENCE TO RELATED APPLICATIONS

Benefit of international priority and internal priority is claimed under all applicable international treaties and national laws throughout the world as to the subject matter of U.S. Provisional Patent Application Ser. Nos. 60/412,817 and 60/479,150, respectively filed on Sep. 24, 2002 and Jun. 18, 2003 in the names of David T. Redmon, Thomas E. Jenkins, Ian Trillo Fox, Juan De Dios Trillo Monsoriu and Timothy D. Hilgart, and this application is also a continuation of U.S. Ser. No. 10/667,893, filed Sep. 23, 2003, now U.S. Pat. No. 7,449,113, and entitled CONTROLLING WASTEWATER TREATMENT PROCESSES, incorporated herein by reference.

TECHNICAL FIELD

This invention relates to methods and apparatus for continuing, automated control of biological wastewater treatment processes. In certain preferred embodiments, it relates to control of aeration in suspended growth biological treatment processes, especially in activated sludge processes.

BACKGROUND OF THE INVENTION

Most forms of biological processes for treatment of wastewater involve introducing oxygen-containing gas into wastewater with some form of energy-consuming apparatus. Generally, an electric motor is the energy consumer, and it powers some kind of agitator, compressor or blower that provides driving force to distribute the oxygen-containing gas in one or more tanks containing wastewater. For many years it has been apparent that the cost of electricity to operate such equipment is one of the largest, and often the largest, operational cost of wastewater treatment plants.

In the early history of the art of biological treatment, process control was "manual". Aided to an inadequate extent by visual observation and by instrumentation that was usually limited and rudimental, plant operating personnel adjusted gas flow in an attempt to match that flow to the amount of oxygen consumed in the biological process. Too much flow, overshoot, wasted electricity. Too little, undershoot, impaired the quality of treatment.

As the art progressed, it was recognized that savings in electricity and more consistent quality of treatment could be achieved with better and more complete instrumentation. Then, it began to be apparent that major gains in energy savings and quality could be attained through automatic control of gas flows and other aspects of the processes.

Since at least as early as the 1960s, efforts at automated control of the flow of oxygen-containing gas into biological wastewater treatment processes have included measurements of the DO (dissolved oxygen) level in the wastewater in the treatment tank. Gas flow is automatically reduced if DO exceeds a predetermined target or set point and increased if DO falls below the target. This mode of operation reduced but did not eliminate the problem of overshoot and undershoot of the true oxygen and energy requirements of the biological processes.

Since as least as early as the 1970s, the need to conserve energy and tightening regulations on plant effluent quality have provided ample and continuing motivation to develop better forms of automated control. However, despite many suggestions for additional and/or other modes of automatic control, in actual practice, control based primarily on DO levels, with ensuing energy wastage and quality challenges, has remained quite popular.

Present-day continuation of the popularity of control based primarily on DO measurements, accompanied by wastefulness and quality problems, suggests there is a long-felt, unsatisfied need for improvements in control of biological processes for the treatment of wastewater. The present invention seeks to fulfil this need.

SUMMARY OF THE INVENTION

Our invention meets this need in a variety of ways. It includes both methods and apparatus. Among these are methods of controlling a biological wastewater treatment process and control system apparatus for controlling a biological wastewater treatment process. These comprise a number of different combinations of devices, steps and conditions, each of which represents a particular aspect of what we have invented.

A first method aspect comprises, in at least one treatment tank containing wastewater, conducting a biological process supported, at least in part, by introducing oxygen-containing gas into the wastewater in the form of bubbles provided in the wastewater by a gas supply system, and causing at least a portion of the oxygen in said bubbles to dissolve in the wastewater. At least a portion of the dissolved oxygen to be consumed by the biological process, wherein the oxygen so dissolved may represent an excess or a deficiency relative to the oxygen consumed by the biological process, and wherein at least one gas collection member is positioned in the treatment tank to receive offgas representing gas from said bubbles that has not been dissolved into the wastewater. Operation of the biological process is controlled with a control system that, as the process operates, exercises continuing control over the process at least partially in response to measurements that are taken by the control system from the offgas collected in the gas collection member and that are correlative with the amount of one or more gases in the offgas. The invention utilizes data obtained through said measurements to provide, in the control system, for the varying amounts of consumption of oxygen that occur in the biological process, control values, or components of control values, that change in response to, while remaining correlative with, such varying amounts of oxygen consumption, and generating control signals based on the changing control values or components.

A second method aspect comprises, in at least one treatment tank containing wastewater, conducting a biological process comprising suspended growth aeration. In this process, biological breakdown of suspended and/or dissolved waste material present in the wastewater is supported, at least in part, by introducing oxygen-containing gas into the wastewater in the form of bubbles provided in the wastewater by a gas supply system. These bubbles rise through at least a portion of the depth of the wastewater in the direction of its upper surface, and cause at least a portion of the oxygen in said bubbles to dissolve in the wastewater and at least a portion of the dissolved oxygen to be consumed by the biological process. The oxygen so dissolved may comprise an excess or represent a deficiency relative to the oxygen consumed by the biological process. At least one gas collection member is positioned to receive offgas representing gas from said bubbles that has not been dissolved into the wastewater. The method controls the operation of the process with a control system that, as the process operates, exercises continuing control over the introduction of wastewater into the process and/or over the quantity of gas discharged into the tank through said gas supply system, at least partially in response to measurements of the offgas, taken by the control system, that are correlative with the amount of one or more gases in the offgas. Data obtained through said measurements is utilized to provide, in the control system, control values which are at least in part correlative with changing needs for the supply of dissolved oxygen to the wastewater as determined by the control system at least partly on the basis of such data.

A third aspect, which is control system apparatus, comprises at least one gas collection member that is positioned in at least one wastewater processing tank in which the biological process is conducted, to collect from the wastewater in the processing tank, offgas representing at least a portion of oxygen-containing gas that has been introduced into but not dissolved in the wastewater. There is at least one measuring device comprising at least one gas detector that is connected with the gas collection member and that can take measurements and thereby provide data indicative of the amount of at least one gas in the offgas collected by the gas collection member. There is also at least one controller connected with the measuring device, which controller defines, for the varying amounts of consumption of oxygen that occur in the biological process, control values, or components of control values, that change in response to, while remaining correlative with, such varying amounts of oxygen consumption, which controller generates control signals based on the control values or components.

A fourth aspect involves apparatus of the type that comprises at least one tank for conducting a biological process comprising suspended growth aeration on wastewater, and a gas supply system for introducing oxygen-containing gas into the wastewater in the form of bubbles and causing at least a portion of the oxygen in said bubbles to dissolve in the wastewater and at least a portion of the dissolved oxygen to be consumed by the biological process. The oxygen so dissolved may comprise an excess or represent a deficiency relative to the oxygen consumed by the biological process. At least one gas collection member is positioned to receive offgas representing gas from bubbles that have not been not dissolved into the wastewater. This apparatus has a control system comprising several parts. there is at least one gas detector that can take measurements of the amount of at least one gas collected in the gas collection member. There is also at least one DO (dissolved oxygen) detector having a probe that, when in contact with the wastewater in the tank, can take measurements of the DO level of the wastewater. Also included is at least one controller that contains or has access to code which the controller can utilize with said measurements to provide, in the control system, control values which are at least in part correlative with changing needs for the supply of dissolved oxygen to the wastewater.

The foregoing general methods and apparatus may optionally be practiced in any one or more of the following particular modes, which may involve particularization of the general methods and apparatus and/or the addition of steps or other features. The following optional modes, whether employed singly or in any combination, represent not only preferred modes of practicing the general methods and apparatus, but, when combined with any of the general methods and/or apparatus, are also believed to be inventions.

A number of these particular modes are applicable to each of the general method and/or apparatus aspects and may be combined with any or all other particular modes. Among these particular modes are those:

wherein the biological process comprises suspended growth aeration which includes biological metabolization of suspended and/or dissolved waste material present in the wastewater is supported, at least in part, by the oxygen-containing gas introduced into the wastewater;

wherein the biological process is a continuous flow process;

wherein the biological process is an activated sludge process;

wherein the control system is programmed to tend to maintain a positive DO level in at least a portion of the tank;

wherein said gas collection member is positioned at a surface of the wastewater;

comprising a tank having a wastewater inlet and an outlet, and the control system includes DO measuring devices at first and second locations in the tank, the first location being closer to the inlet than to the second location, or the second location being closer to the outlet than to the first location;

wherein the first location is closer to the gas collection member than to the second location, or the first location is adjacent the inlet and the second location is adjacent the outlet; or the gas collection member and the first location are each closer to the inlet than to the second location, or the gas collection member and the second location are each closer to the outlet than to the first location, or the gas collection member is positioned between the first and second locations;

comprising an elongated tank having upstream and downstream halves;

comprising an elongated tank divided into at least two sections by a baffle and/or other form of length divider, and at least one of said sections has upstream and downstream halves;

wherein a gas collection member is positioned in an upstream half of a tank or tank section to receive offgas representing gas from bubbles that have not been dissolved in the wastewater;

wherein the control system includes at least two DO probes respectively positioned in upstream and downstream halves of a tank or tank section for gathering data with respect to DO levels;

comprising a tank or tank section having an upstream end, and at least portions of the gas collection member and of a DO probe positioned in the upstream half of the tank are respectively within about the first 10% or 15% or 20% of the length of the tank, measured from the upstream end;

wherein measurements of the offgas taken by the control system are correlative with the amount of at least one gas representing at least a portion of the composition of the offgas;

wherein the oxygen-containing gas is or comprises air and measurements of the offgas taken by the control system are correlative with the amount of oxygen or the amount of carbon dioxide or the amounts of oxygen and carbon dioxide in the offgas;

wherein a controller contains or has access to code, and optionally also tables of data, with the aid of which it defines said control values;

wherein the system operates as a feed forward controller where control outputs are generated, at least in part, based on requirements control values and performance control values;

wherein said control values are requirements control values;

wherein said control values comprise requirements control values;

wherein the control values comprise requirements control values correlative with the oxygen consumed by the biological process, as determined by the control system;

wherein said control values comprise DO control values correlative with changing amounts of oxygen-containing gas required to return the DO level in the wastewater to a target value;

wherein said control values comprise performance control values correlative with variations in the ability of the gas supply system to transfer oxygen to the wastewater;

wherein said control values comprise requirements control values combined with DO control values;

wherein said control values comprise requirements control values combined with DO rate of change values and DO control values;

wherein said control values comprise requirements control values combined with performance control values;

wherein the control system comprises at least one gas quantity regulating apparatus which, in response to control inputs from the control system, changes or maintains the quantity of gas introduced into the wastewater;

wherein the control system comprises at least one liquid flow regulating apparatus which, in response to control inputs from the control system, changes or maintains the quantity of wastewater introduced into the tank; and comprising at least first and second tanks, the second of which is controlled simultaneously with the first tank, or which is controlled independently from the first tank.

A number of the particular modes are applicable to each of the general method aspects and may be combined with any or all of the other particular modes. Among these particular modes are those:

wherein said excess or deficiency manifests itself as an increase or decrease in the DO (dissolved oxygen) level of the wastewater;

comprising providing OP (operational performance) data in the control system;

comprising providing PS (performance standard) data in the control system;

comprising providing RSP (relative system performance) data in the control system that is derived at least in part with PS data;

comprising: (A) causing the control system to take, at one or more locations in the wastewater, continuing measurements that are correlative with DO levels in the wastewater differing positively and/or negatively from a target DO value; (B) generating, in the control system, DO control values of magnitude sufficient, when applied in conjunction with requirements control values, to at least partially offset deviations of DO level in the wastewater from the target DO value;

wherein the control system generates DO control values correlative with the amount of oxygen required to move the DO level in the wastewater to the target DO value;

wherein: (A) within at least one tank, the wastewater flows along a flow path that has upstream and downstream portions, (B) a gas collection member is positioned along the upstream portion to receive offgas representing gas from bubbles that have not been fully dissolved in the wastewater, (C) data with respect to DO level is gathered from at least two DO probes respectively positioned along the upstream and downstream portions of the flow path; (D) the control system establishes, on a continuing basis, control values for the entire tank that are at least in part correlative with a combination of (1) changing consumption of oxygen by the biological process, as measured with the aid of said gas collection member and (2) said DO level data gathered from the DO probes positioned along the upstream and downstream portions of the flow path;

wherein: (A) the control system establishes, on a continuing basis, control values that are at least in part correlative with a combination of (1) changing consumption of oxygen by the biological process, as measured with the aid of said gas collection member and (2) deviations, from a first target value, of the DO level measured by a DO probe positioned along an upstream portion of the wastewater flow path, and (B) the control system adjusts said first target value, on a continuing basis, with the aid of data correlative with deviations, from a second target value, of the DO level measured by a DO probe positioned along a downstream portion of the flow path;

wherein the wastewater flows in plug flow;

wherein the wastewater flows along a flow path having a dimension in the direction of wastewater flow that is greater than its average dimension perpendicular to such direction;

wherein: (A) data with respect to the rate of change of DO level is gathered from at least one DO probe positioned in the tank, and (B) the control system establishes, on a continuing basis, control values which are applied to a tank as a whole, said control values being at least in part correlative with a combination of (1) changing consumption of oxygen by the biological process, as measured with the aid of the gas collection member along an upstream portion of a wastewater flow path through the tank (2) DO level data gathered from at least two DO probes respectively positioned along upstream and downstream portions of the flow path and (3) DO rate of change data;

comprising: (A) causing the control system to take, at one or more locations in the wastewater, continuing measurements that are correlative with DO levels in the wastewater differing positively and/or negatively from one or more target DO values; (B) causing the control system to take, at one or more locations in the wastewater, continuing measurements that are correlative with rates of change of DO level in the wastewater; and (C) generating in the control system, on a continuing basis, control values that are at least in part correlative with a combination of the consumption of oxygen in the biological process, of said DO levels and of said rates of change;

comprising: (A) causing the control system to establish, on a continuing basis, performance values that are correlative with the ability of the gas supply system to dissolve said oxygen containing gas in the wastewater, and (B) causing the control system, on a continuing basis, to combine said performance values with requirements control values which are at least in part correlative with changing consumption of oxygen in the biological process;

comprising generating, in the control system on a continuing basis, RSP control values correlative with relationships between (A) OP data, generated by the control system, correlative with the varying ability of the gas supply system to transfer oxygen to the wastewater under fluctuating process conditions, comprising one or more of gas supply system conditions, wastewater conditions, process conditions, and atmospheric conditions, and (B) PS data, provided in the control system, correlative with the ability of the gas supply system to transfer oxygen to water and/or wastewater under predetermined standards for said conditions;

wherein the control values are established at least in part with OP data which are provided in the control system and which is based on one or more of the following: gas supply system conditions, wastewater conditions, process conditions, and atmospheric conditions, and wherein said condition/conditions, including characteristics of any of the foregoing, is/are determined by the control system;

wherein the control values are established at least in part with PS data that includes OTR: Q (oxygen transfer rate: flow) data correlative with oxygen transfer rates which the gas supply system could achieve in clean water at varying rates of flow of gas through the gas supply system;

wherein the control values are established at least in part with apparent alpha values which are correlative with a ratio between (a) the rate, as determined by the system, at which the gas supply system can transfer oxygen to the wastewater and (b) the rate at which the gas supply system can transfer oxygen to clean water;

comprising: (A) providing, in the control system, OTR: Q (oxygen transfer rate: flow) control values correlative with oxygen transfer rates which the gas supply system could achieve in clean water at varying rates of flow of gas through the gas supply system; (B) providing, in the control system, apparent alpha values which are correlative with a ratio between (a) the rate, as determined by the system, at which the gas supply system can transfer oxygen to the wastewater and (b) the rate at which the gas supply system could transfer oxygen to clean water; and (C) deriving RSP values by combining OTR: Q and apparent alpha values;

wherein apparent alpha values are determined at least in part by the control system and reflect changes in the condition of the gas supply system and the wastewater that can affect the amount of oxygen which the gas supply system can transfer to the wastewater;

wherein control values are applied by the system based at least in part on process control needs comprising at least one form of process control needs selected from among process oxygen control needs, DO level control needs, and performance control needs and wherein the applied control value is within plus or minus 20%, more preferably 10%, still more preferably 5% and most preferably 3%, based on the data available in the system at the time the applied control value is applied, of a reference control value which would produce a flow rate of gas and/or wastewater into the biological process that would precisely satisfy the particular need or needs;

wherein control values are applied by the system based at least in part on process control needs comprising at least one form of process control needs selected from among process oxygen control needs, DO level control needs, and performance control needs and wherein the control values are applied directly or indirectly to at least one flow regulating device to provide on a continuing basis control inputs to said device to cause said device to change or maintain the quantity of gas introduced into the wastewater and/or to change or maintain the quantity of wastewater introduced into the tank;

wherein control is effected, at least in part, using data on rates of change of DO level in the tank over one or more predetermined time periods;

wherein the control system derives control inputs based at least in part (1) on differences between (a) the actual wastewater temperature and (b) a selected reference temperature, and/or (2) on differences between (a) the actual barometric pressure acting on the wastewater surface and (b) a selected reference barometric pressure;

wherein the control system exercises control at least partially in response to measurements correlative with OUR (oxygen uptake rate), or OTR (oxygen transfer rate), or OTE (oxygen transfer efficiency), or any combination thereof; and wherein the control system derives control inputs by adjusting the control values at least in part with respect to the control response characteristics of a flow regulating device;

A number of the particular modes are applicable to each of the general apparatus aspects and may be combined with any or all other particular modes. Among these particular modes are those:

wherein the control system comprises at least one of the following: a device for measuring wastewater temperature; a device for measuring gas flow from the gas collection member; a device for measuring the dissolved oxygen content of the wastewater; and a device for measuring oxygen content in the offgas;

wherein the control system comprises a device for measuring wastewater temperature, a device for measuring gas flow from the gas collection member, a device for measuring the dissolved oxygen content of the wastewater, and a device for measuring oxygen content in offgas;

comprising code that defines, on a continuing basis, RSP (relative system performance) control values correlative with relationships between (A) OP (operational performance) data correlative with the varying ability of the gas supply system to transfer oxygen to the wastewater under fluctuating process conditions, comprising one or more of gas supply system conditions, wastewater conditions, process conditions, and atmospheric conditions, and (B) PS (performance standard) data correlative with the ability of the gas supply system to transfer oxygen to water and/or wastewater;

comprising code that defines OP data;

that includes or has access to PS data;

comprising code that defines RSP data at least in part with PS data that is stored in the control system;

wherein PS data is stored in the system and includes OTR: Q (oxygen transfer rate: flow) data correlative with oxygen transfer rates which the gas supply system could achieve in clean water at varying rates of flow of gas through the gas supply system;

wherein at least one control element is connected with the controller and is responsive to the control signals generated in the controller to effect control over at least a portion of the biological process by adjusting at least one parameter of the process;

which further includes one or more liquid flow control units that can control introduction of wastewater into the tank;

which further includes one or more gas flow control units that can control the introduction of gas discharged into the tank through said gas supply system; and further comprising at least one gas quantity regulating apparatus capable of changing or maintaining the quantity of gas introduced into the wastewater, in response to control inputs by the control system including inputs based at least in part on requirements control values and DO control values, wherein the requirements control values and the DO control values are based at least in part on relationships with RSP values.

ADVANTAGES

Some embodiments of the present invention measure oxygen consumption and the performance parameters of the aeration system. This provides an opportunity for "predictive" (or feed forward) control where the required controlled variable (e.g., air flow rate) can be predicted based on oxygen consumption and equipment performance. It is believed that, in practice, prior art control systems have almost exclusively been "reactive" (feedback). These prior systems react to errors in process performance, and errors are thus an inherent result of certain prior control systems' performance. Because of the errors generally inhering in feedback systems the biological activity of microorganisms in processes operated under this mode of control can be compromised by fluctuations in the dissolved oxygen level. With preferred embodiments of our invention, the variables critical to biological activity can be made more stable, resulting in reduced effluent variations.

To minimize the deleterious impact of errors in prior systems, there is a tendency for operators to set the target dissolved oxygen level at a value higher than the minimum level which would be acceptable in a well-controlled operation. This provides a "cushion" to prevent excursions in loading from causing excessive decrease in the dissolved oxygen level. Because the operation of certain preferred embodiments of our system can be more stable and errors can be minimized or eliminated, the target level of dissolved oxygen can be set lower. This can produce higher efficiency and result in significant savings in energy and other associated costs.

Pumping and the time required for reactions to occur in systems that withdraw liquid samples, such as most respirometric techniques, result in a time delay between the beginning of the measurement process and obtaining the results. Because of the construction of preferred embodiments of our invention, it is possible to capitalize on the speed of fast measurement devices leading to near or true "real time" determination of the oxygen requirements and performance of the process.

Some preferred embodiments of our invention monitor the impact of changes in oxygen consumption in real time. These embodiments afford an opportunity to detect slug loading or inhibitory contaminants from industrial contributors or other sources. The rapid response of these embodiments will minimize the impact of these changes on the effluent quality and alert the operator so proper corrective measures can be implemented.

Some existing systems measure the oxygen demand of the wastewater. Contrary to what is common in prior practice, certain embodiments of the invention can measure the performance of the aeration equipment (i.e. diffusers) on a continuing basis and even in real time. These measured parameters may for example include oxygen transfer efficiency and alpha (ratio of actual process to clean water performance). The present control system can apply apparent alpha values, determined by the control system, that reflect changes in the condition of the gas supply system and the wastewater that can affect the amount of oxygen which the gas supply system can transfer to the wastewater. This information provides insights into actual aeration system performance and affords an opportunity to monitor degradation of the system over time due to fouling and/or other forms of degradation of aerator performance. Cleaning or replacement of diffusers can be optimized based on actual performance, minimizing the costs of premature or unduly delayed cleaning or replacement, thus permitting cleaning before performance and energy efficiency is significantly degraded.

In the tuning of certain prior systems, system response to errors and load changes is monitored and the parameters affecting response are modified by empirical results derived from observation and experience. For example, this is true of certain "PID" (Proportional-Integral-Derivative) control algorithms, but it is also generally true of feedback control algorithms. Changes in aeration system condition, incoming waste and ambient conditions required modification of the tuning parameters. Because in certain of its preferred embodiments our system's response is based on the physical configuration of the process equipment and a combination of known and measured aeration system effectiveness, the tuning is insensitive to changes in aeration system condition, incoming waste and atmospheric conditions.

Once data on the physical configuration and aeration system performance is stored, these embodiments can predict the response to the above-mentioned changes by mathematical calculations based on known performance parameters.

Certain prior control systems have used "lumped parameter" tuning, where the effects of process loading, biological performance and aeration system performance are not differentiated in determining the response of the system to perturbations. A change in process parameters required a change in the tuning of the control system. With certain embodiments of our control system process parameters related to process loading, biological performance and aeration system performance are individually monitored, making such systems both more responsive and more stable.

A number of existing methods used to measure oxygen requirements of a treatment system, such as most respirometric techniques (also referred to as respirometry), involve movement of samples of the contents of the aeration tanks to a reaction cell. In many systems additional chemicals must be used to determine the oxygen requirements of the wastewater. The pumping and fluid handling systems are prone to plugging and require significant maintenance. The additional chemicals, if required, are an additional cost of operation. Because preferred embodiments of our invention use gas leaving the surface rather than withdrawn liquid samples, it is not prone to such plugging and maintenance is minimized. Reliability is also enhanced.

All embodiments of the invention, whether specifically disclosed herein or not, will not necessarily have all of the above advantages, nor the same combinations of advantages. Moreover, users of the invention, manufacturers of components or complete systems involving the invention and other persons skilled in the art may identify, with the aid of the present disclosure and/or through experience with the invention, embodiments that inherently include advantages not discussed above.

VARIOUS AND PREFERRED EMBODIMENTS

Introduction

Figure 1:
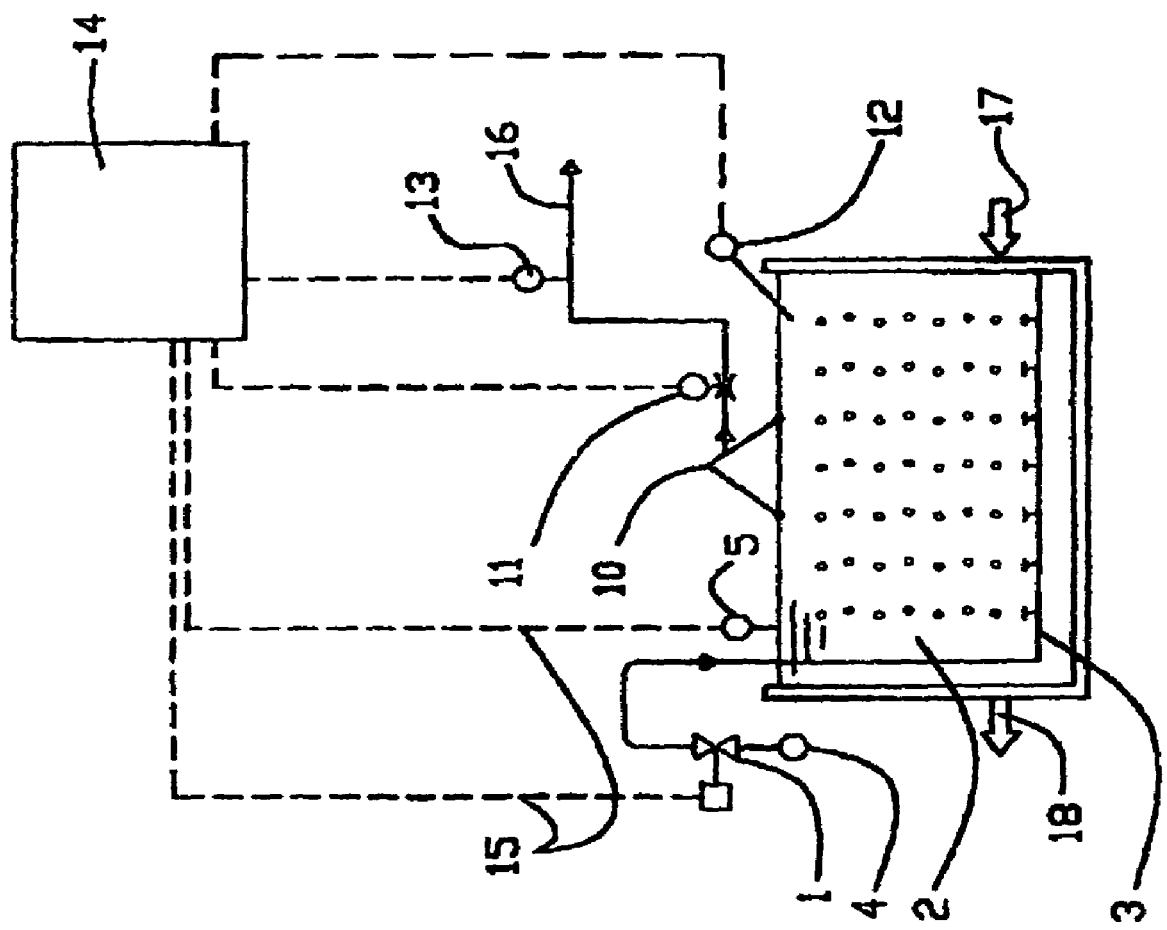
FIGS. 1-4 are each schematic diagrams of biological wastewater treatment processes and components of control systems according to the invention.

In general, our control method and apparatus are useful with a wide variety of biological wastewater treatment processes. Typically, these are processes in which aeration with oxygen-containing gas supports the metabolizing of waste by bacteria in the wastewater, e.g., activated sludge processes, in one or more tanks. Other gases or vapors may be used in or in connection with these processes for any suitable purpose, e.g., cleaning gas.

Our control system employs any form of measurement apparatus to receive data on one or more process parameters, which may include any parameters of or affecting the process. Such parameters include varying amounts of one or more gases in offgas recovered from the wastewater in the tank, and may include, for example, other gas and liquid flows, water temperature, atmospheric pressure and other variables. Measurements of these parameters may be made by any suitable kind(s) of measurement devices. They are connected with, and are used to furnish needed data on process parameters to, a controller.

The data outputs of the measurement devices to the controller, whether in electrical or other form, need not correspond directly, e.g., be numerically proportional with, measured parameters expressed in customary units. However, for at least some measurements of interest, measurement devices are available that give outputs corresponding directly with measured parameters, and these devices are preferred.

The controller employs the data outputs to establish varying control values correlative with, among a variety of possibilities, one or more varying process needs for oxygen. These include requirements control values, and may also include DO control values and/or performance control values. How this is accomplished can depend to some extent on the nature of the measurement device outputs and/or the capabilities of the controller.

Whether the data outputs do or do not directly correspond with the measured parameters, the controller may for example contain or have access to, and derive any of the control values from, a table which contains and matches data output values with appropriate, precalculated control values. On the other hand, the controller may calculate any of the control values from algorithms, as data is received, where directly corresponding data outputs are available to it for the parameters needed in the calculation. Calculation of control values as data is received is also possible if directly corresponding data outputs are not available to the controller, for example when it contains or has access to means for converting those data outputs to a form useful in such calculations. Detailed information on calculation of control values is provided below.

Varying control values, present in the controller, are used, with or without adjustment, to provide control signals in the controller. Any suitable kind of automated control element(s), such as control valves, weirs, motor controls and other devices, is/are connected with the controller, which transmits the control signals to them. The signals may be the control values themselves or may differ from them. For example, the control values may have been adjusted in generating control signals, e.g., to conform with signal requirements of the control elements or with such factors as the operational characteristics of those elements, of the gas supply system or of the process.

Preferably, the control values directly correspond numerically with the process need or needs to which the control values relate, and the signals have adjusted magnitudes which provide some selected increment of the control action required by the control values and the related need. Then, as the system takes continuing measurements of process parameters affected by the incremental control action, the control values may remain the same or be changed by the controller as a result of observation of the effects of the control action applied and/or of other factors. Further control signals of the same or different magnitude as previous ones may then be issued to the control element(s) to continue the control action in increments for satisfying the then current control values.

Separate control signals may be issued by a controller or controllers, separately representing different kinds of control values. For example, varying, separate signals may be transmitted to separate, plural gas supply control elements, which signals are respectively based on varying requirements control values and varying DO control values. Then, based on the separate control signals the separate control elements can supply separate, regulated flows of gas from separate gas supply lines. These flows can enter a treatment tank as separate flows or, after having been combined with each other upstream of the tank but downstream of the control elements, as a single flow. The aggregate amount of these separate flows, whether entering the tank in the form of single or plural flows, can be in an amount sufficient to meet the varying needs for oxygen to metabolize, and, optionally, to otherwise treat, waste in the wastewater and to maintain a substantially stable DO level.

However, the controller preferably generates varying control values of which two or more different kinds of control values are component parts, such as a combination of varying requirements control values and varying DO control values. Then, the controller may, if desired, generate varying control signals correlative with a varying combination or total of the different control value components. These signals may if desired be transmitted to a single control element. In turn, such a control element may if desired cause a single gas line, or a combined set of gas lines, to provide gas to the wastewater in the amounts needed.

When, as preferred, the varying control values used to generate control signals include as component parts requirements control values, DO control values and performance control values, gas may then be supplied in the varying amounts required to meet the need for oxygen to metabolize or otherwise treat waste, suitably adjusted to maintain stable DO levels and account for performance changes. Performance changes may for example involve one or more of the following: gas supply system conditions, e.g., the results of diffuser fouling, diffuser cleaning or changes in gas supply rates and the resulting changes in diffuser flux rate where area-release fine bubble diffusers are involved; changes in wastewater conditions; variations in process conditions, and changing atmospheric conditions. Such condition/conditions, including characteristics of any of the foregoing, is/are, or may be, as determined by the control system.

Whatever the nature and mode of use of the control values and control signals, the control system causes the control elements to act in response to those signals for effecting control over the biological process. The control system may effect control over the biological process in any way that is effective in matching the availability of oxygen-containing gas to the changing consumption of or need for oxygen in all or a portion of the process, and possibly for meeting other needs.

Examples of ways of effecting control over the process include one or more of the following: turning up or turning down the flow of gas and/or wastewater to the process, changing the distribution of gas introduced into the system, changing the quantity or distribution of wastewater in the tank, e.g. as in step feeding, changing the operating intensity of mechanical or brush aerators, turning at least a portion of the mechanical or brush aerators and/or diffusers that are available in the system on or off, feeding zero or varying amounts of supplemental oxygen to the process, and altering the oxygen transfer efficiency of the operation, such as by changing the distance traversed by gas bubbles as they pass through the wastewater, e.g., by turning agitators on, up, down or off and/or altering the wastewater depth in a given tank. Control elements will be selected that are suitable for the chosen way(s) of effecting control over the process.

The following discussions and FIGS. 1-5 present several specific, illustrative embodiments of wastewater treatment apparatus, control system apparatus and software that are useful in the invention.

DETAILED DESCRIPTION OF THE DRAWINGS

FIGS. 1-4 schematically illustrate exemplary biological process equipment including tanks and means for introducing oxygen-containing gas into wastewater in the tanks. These figures also illustrate control system arrangements that are compatible with the process equipment layouts and that include measuring apparatus to derive data and controllers to derive control inputs for the process. FIG. 5 schematically illustrates one example of many possible arrangements of functions within the process and particularly within software that skilled programmers can design for use in controllers carrying out the present invention, such as the embodiments of FIGS. 1-4.

FIG. 1

The embodiment of FIG. 1 includes tank 2 which contains wastewater in which a suspended growth aeration process is being conducted. Inlet 17 and outlet 18, respectively, are provided for entry of wastewater to be aerated in the tank and discharge of mixed liquor to subsequent processes.

In and around the tank are components of a gas supply system. Among these are plural devices 3 of any suitable type for introducing oxygen-containing gas bubbles into the wastewater, e.g., fine bubble diffusers, a source of gas 4, which is shown as a pipe but could be another device and gas flow regulating device 1, which is shown as a valve, but could be another device.

In the process, which may aerate the wastewater continuously or intermittently, bubbles of oxygen-containing gas, generated by the gas supply system, rise through at least a portion of the depth of the wastewater in the direction of its upper surface. Oxygen in the bubbles dissolves in the wastewater. At least a portion of the dissolved oxygen is consumed by the biological process. The oxygen so dissolved may comprise an excess or represent a deficiency relative to the oxygen consumed by the biological process. Such excess or deficiency may manifest itself as an increase or decrease in the DO (dissolved oxygen) level of the wastewater.

A control system according to the invention controls the aeration process. In this embodiment, it includes a device 5, for measuring wastewater temperature, a gas collection member, e.g., a hood 10 for collecting gas escaping from the tank, a device 11 for measuring gas flow from the hood, a device 12 for measuring the dissolved oxygen content of the wastewater, a device 13 for measuring oxygen content in offgas, a controller 14 for automatically executing control logic, connections 15 for transmitting measured values to the controller and control signals from the controller and an outlet 16 for discharging sample air to the atmosphere.

In the embodiment illustrated in FIG. 1 hood 10 represents a location from which to obtain data useful to determine the estimated oxygen transferred by the gas supply system. Probe 12 represents a location from which to obtain data to determine the estimated DO level in the tank.

From this data, controller 14 establishes corresponding requirements control values which are correlative with the oxygen transferred by the gas supply system and the rate of increase/decrease of DO, as determined by the control system. Controller 14 also establishes DO control values correlative with the oxygen adjustment required, as determined by the control system, to return DO levels to a target value. Preferably, the establishment of requirements control values is at least partially in response to measurements correlative with the OUR (oxygen uptake rate) of the wastewater, or the OTR (oxygen transfer rate) of the gas supply system, or the OTE (oxygen transfer efficiency) of the gas supply system, and preferably some combination of these.

Preferably, the requirements control values correlative with the oxygen consumed by the biological process, as determined by the control system, are combined with DO control values. The controller combines these two kinds of control values, whether additive or offsetting to some extent, and from this total establishes control values and corresponding control signals that, with or without adjustment, e.g., to account for the response characteristics of the valve actuator, are transmitted by controller 14 to gas flow regulating valve 1. Where the process is a continuous flow process, the combination of control values generated by the control system may be correlative with a combination of rates of oxygen consumption and rates of change of DO level in the tank over one or more predetermined time periods. Typically, the control system is programmed to tend to maintain a stable, positive dissolved oxygen level in at least a portion of the tank, while meeting the varying oxygen needs of the biological process.

The selected locations for the hood and probe may be arbitrary if the tank contents are substantially completely mixed and homogenous, or, if not, may be locations of specific interest to the operator.

FIG. 2

Here again, a control system according to the invention controls the aeration process in a plural tank aeration operation. In common with the FIG. 1 embodiment, this embodiment has a first tank 23 which contains wastewater in which a suspended growth aeration process is conducted. Inlet 78 and outlet 79, respectively, are present for entry of wastewater into the tank and discharge of mixed liquor.

In and around this tank are components of a gas supply system. Among these are a source of gas 25, which is shown as a pipe but could be another device, and plural devices 24 of any suitable type for introducing oxygen-containing gas bubbles into the wastewater.

Figure 2:
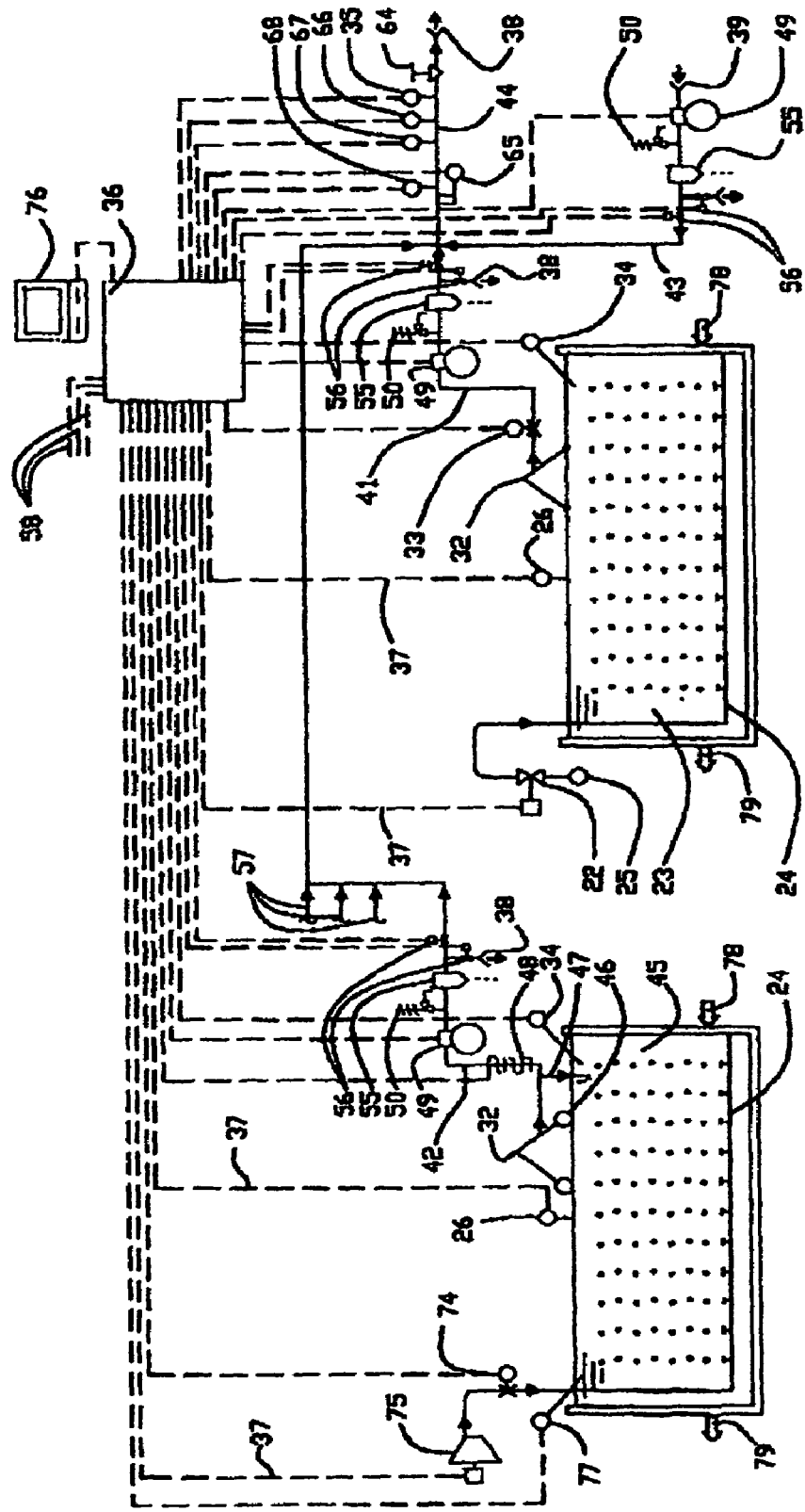

The FIG. 2 embodiment includes a second aeration tank 45 which contains wastewater undergoing suspended growth aeration. Inlet 78 and outlet 79, respectively, are provided for entry and discharge of wastewater and mixed liquor.

Blower or compressor 75 supplies air or gas to tank 45 and optionally to one or more additional tanks. Plural devices 24 of any suitable type are present in tank 45 and are connected to the blower for introducing oxygen-containing gas bubbles into the wastewater.

There are three sampling lines 41, 42 and 43. They respectively include certain auxiliary devices, discussed below. Lines 41 and 42 draw gases from the hoods 32, which are part of measurement apparatus to be discussed further below, to determine requirements control values for the tanks 23 and 45. Hood 32 of tank 45 has a flotation device 46 to maintain the hood at the wastewater surface during water level variations. Line 43 and its auxiliary devices draw ambient air from the atmosphere through intake 39 for calibrating and verifying the accuracy of the measurement apparatus.

Auxiliary devices present in all three sampling lines include compressors 49 to provide positive flow of offgas from the hoods 32 through the sampling lines to the measurement apparatus for analysis, pressure relief valves 50 to prevent build-up of excessive pressure in the lines, drying devices 55 to remove entrained water and water vapor from the gas in the lines prior to its entry into the measurement apparatus and valves 56, which may be other kinds of devices. These valves control the direction of gas and/or gas flow in proper sequence from various tanks to the measurement apparatus and/or to the atmosphere.

Optionally, several additional system elements may be provided. For example, line 42 may have a discharge conduit 47 to release excess gas from the hood 32 of tank 45 into or adjacent to the wastewater and heating system 48 to prevent condensation of water vapor. Lines 57 may provide entrances for gas from other hoods or tanks into line 42 and the measurement apparatus.

Some elements of the measuring apparatus of this embodiment of the control system are arranged along analysis line 44. Device 65 detects moisture or condensate in offgas or ambient gas flow. Device 68 measures gas temperature, while device 67 measures gas pressure. Device 66 measures carbon dioxide content in the offgas. Restriction 64 throttles gas flow to create positive pressure in the measurement system. Device 35 measures oxygen content in offgas, while outlet 38 discharges used sample air to the atmosphere.

Other elements of the measuring apparatus include devices 26 in each tank, for measuring wastewater temperature, the above-mentioned hoods 32 for collecting gas escaping from the tanks, a device 33 in tank 23 for measuring gas flow from the hood, device 74 for measuring gas flow into tank 45 and device 34 in each tank for measuring the dissolved oxygen content of the wastewater.

In the embodiment shown in FIG. 2 the arrangement in tank 23 differs from the arrangement in tank 45 in the technique employed for measuring the gas flow to the respective tanks. In tank 23 device 33 is used for measuring the gas flow escaping from the hood, and this gas flow rate is extrapolated to encompass the entire gas flow to the tank by the ratio of the hood surface area to the area of the entire tank. In tank 45 device 74 is used for measuring the gas flow to the entire tank directly. Factors bearing on deciding which arrangement to use in a given tank include the extent of any variation in the process from one location to another within the tank, and the nature of existing instrumentation associated with the tank when converting to the use of the present invention. As the figure shows, these two arrangements may be used in different tanks of the same plant or may be used in combination with each other within the same tank.

With the aid of data from the measuring apparatus a controller 36 automatically executes control logic for each tank. Interface device 76 is provided to display measured and calculated data and to assist in entering constants and control parameters for operating the system. Connections 37 transmit measured values to the controller and control signals from the controller for tanks 23 and 45. Through signals sent via these connections the controller adjusts the gas flow to tank 23 with gas flow regulating device 22, which is shown as a valve, but could be another device, and adjusts gas flow to tank 45 by altering the speed of blower 75. Connections 58 transmit measured values from other measurement apparatus to the controller and control signals from the controller for other hoods or tanks, where such are provided.

As shown by FIG. 2 and the above discussion, each of tanks 23 and 45 has one point of gas flow entry and control. As in FIG. 1, each hood 32 represents a location from which to obtain data useful to determine the varying amounts of oxygen transferred by the gas supply system for each tank.

First tank 23 has a DO sensor, device 34, located at the upstream end of the tank. Second tank 45 has first and second DO sensors, devices 34 and 77, located respectively at the upstream and downstream ends of that tank. The DO sensors, whether or not single or dual sensors are used in the second tank, provide data on a continuing basis concerning varying DO levels in their respective tanks. Such data is useful to provide DO rate of increase/decrease data and to determine DO control values that are correlative with the varying oxygen adjustment required, as determined by the control system, to return DO levels to a target value.

From this data, controller 36 establishes, individually for each tank, requirements control values which are based on the oxygen transferred by the gas supply system and the rate of DO increase/decrease, in the respective tanks, as determined by the control system. From a combination of the requirements control values and the DO control values for each tank, controller 36 establishes separate and varying gas rates and corresponding control signals that will satisfy varying and differing needs for oxygen in the respective tanks. These separate signals are sent to gas flow regulating device 22 and to blower 75 as required to meet such needs. The calculations for each tank may be performed sequentially or simultaneously in a single controller or may be performed in a separate controller for each tank.

FIG. 3

Figure 3:
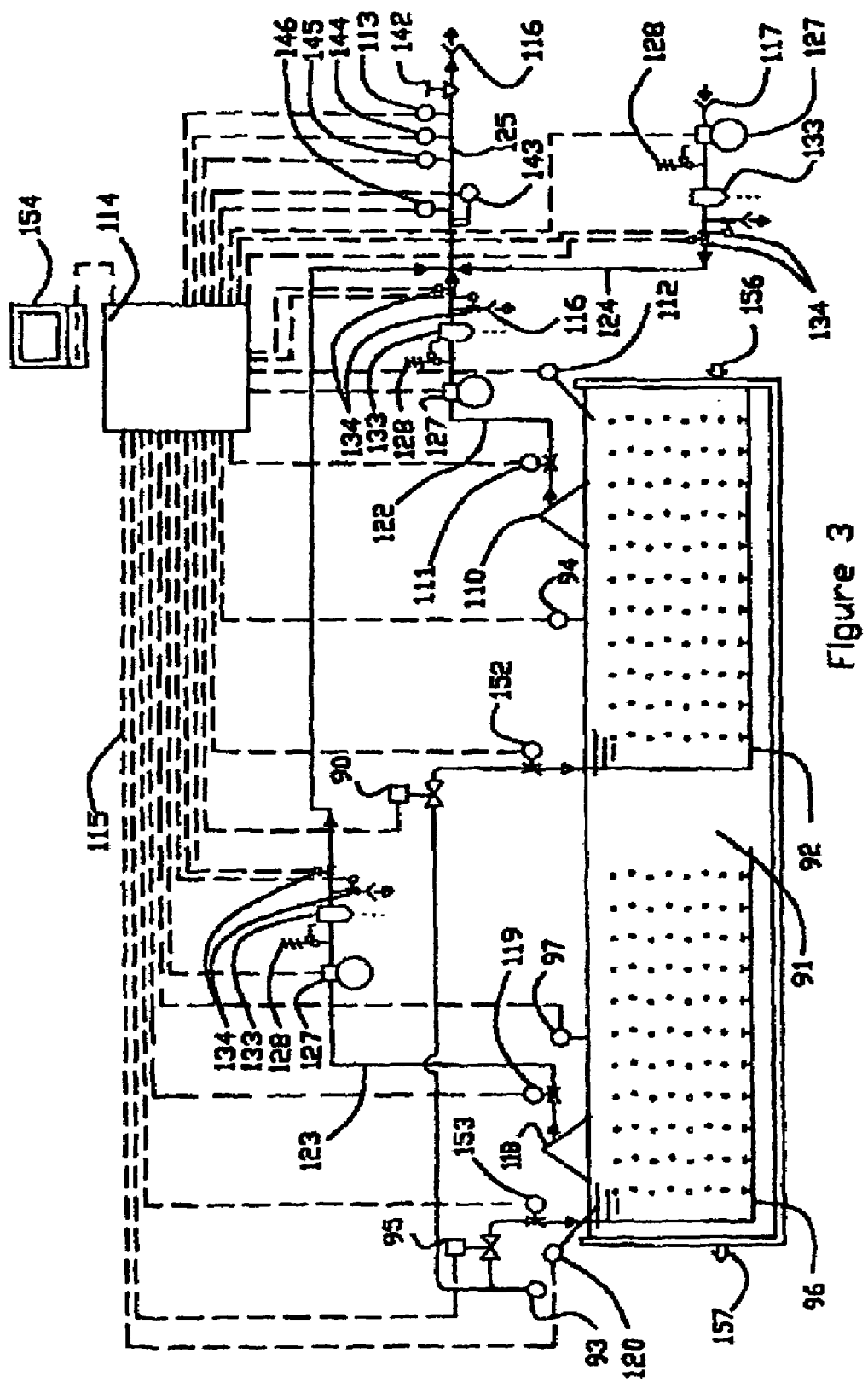

In common with FIG. 1, the embodiment of FIG. 3 has a tank 91 which contains wastewater in which a suspended growth aeration process is being conducted. Inlet 156 and outlet 157, respectively, are provided for entry of wastewater to be aerated in the tank and discharge of mixed liquor. The tank has at least two distinct zones in which gas flow may be controlled independently. Here again, a control system according to the invention controls the aeration process.

In and around the first control zone of tank 91 are components of a gas supply system. Among these are plural devices 92 of any suitable type for introducing oxygen-containing gas bubbles into the wastewater, a source of gas 93, which is shown as a pipe but could be another device and gas flow regulating device 90, which is shown as a valve, but could be another device. The gas supply system of the second control zone of the tank is also served by the gas source 93 and is provided with a gas flow regulating device 95 and plural devices 96 introducing oxygen-containing gas bubbles into the wastewater.

The first control zone of the tank, in common with FIG. 1, includes a device 94, for measuring wastewater temperature, a gas collection member, e.g., a hood 110, for collecting gas escaping from the tank, and a sampling line 122. Arranged along sampling line 122 are measuring devices and several auxiliary items, discussed below, and a device 111, for measuring gas flow from the hood.

Associated with the second control zone are a device 97, for measuring wastewater temperature, a hood 118, for collecting gas escaping from the tank, and a sampling line 123. Along line 123 are a device 119, for measuring gas flow from the hood, and various auxiliary devices.

A third sampling line 124, which also includes auxiliary devices, is also installed. It receives ambient air from intake 117 for calibrating and verifying the accuracy of the system.

The auxiliary devices in lines 122, 123 and 124 include compressor or compressors 127 to provide a positive flow of offgas from hood 110, hood 118 and intake 117 through these lines. Pressure relief valves 128 prevent build-up of excessive pressure in the lines. Drying systems 133 remove entrained water and water vapor from offgas. Valves 134 or other devices control flow of air and/or other gas from the hoods or intake into a measurement system that includes sample analysis line 125.

On line 125 are found a restriction 142 which throttles gas flow to create positive pressure in the measurement system and a device 143 which detects moisture or condensate in offgas or ambient gas flow. Device 144 measures carbon dioxide content in the offgas. Device 145 measures gas pressure, device 146 measures gas temperature. Device 113 measures oxygen content in the offgas, and an outlet 116 discharges sample air to the atmosphere.

Other elements of the measurement system include devices 152 and 153 which measure gas flow to the first and second zones of the tank, as well as devices 112 and 120 for measuring the dissolved oxygen content of the wastewater in the first and second zones.

The control system includes a controller 114, for measurement and process control. It automatically executes control logic for both zones of the tank. Connections 115 transmit measured values from the measurement system to the controller and control signals from the controller to valves 90 and 95. Interface device 154 can assist in entry of constants and control parameters into the system and displays measured and calculated data.

In the embodiment illustrated in FIG. 3 each portion of the tank constitutes a separate zone of operation, with the ability to measure and control gas flow in each of the zones independently of the other zone. It is usual, but not mandatory, that the tank will be configured as a plug flow tank so that the flow of wastewater under treatment will be from the first zone into the second zone, with or without other intervening zones. In this embodiment requirements control values for each zone are calculated independently of all considerations of previous or subsequent zones. Similarly, DO control values for each zone are calculated independently of all considerations of previous or subsequent zones. This is true whether or not the calculations for each zone are performed sequentially or simultaneously in a single controller or the calculations are performed in a separate controller for each zone.

From a combination of the requirements control values and DO control values for each zone, controller 114 establishes separate and varying gas rates and corresponding control signals that will satisfy the varying needs for oxygen in the respective zones. These signals are sent to gas flow regulating devices 90 and 95 as required to meet such needs.

Additional embodiments implicit in the arrangement identified in FIG. 3 and employing the principles illustrated therein would include more than two separate control zones in a single plug flow tank. or two or more separate control zones in parallel plug flow tanks. The principles illustrated by FIG. 3 are further independent of whether or not baffles or tank walls separate control zones.

FIG. 4

Figure 4:
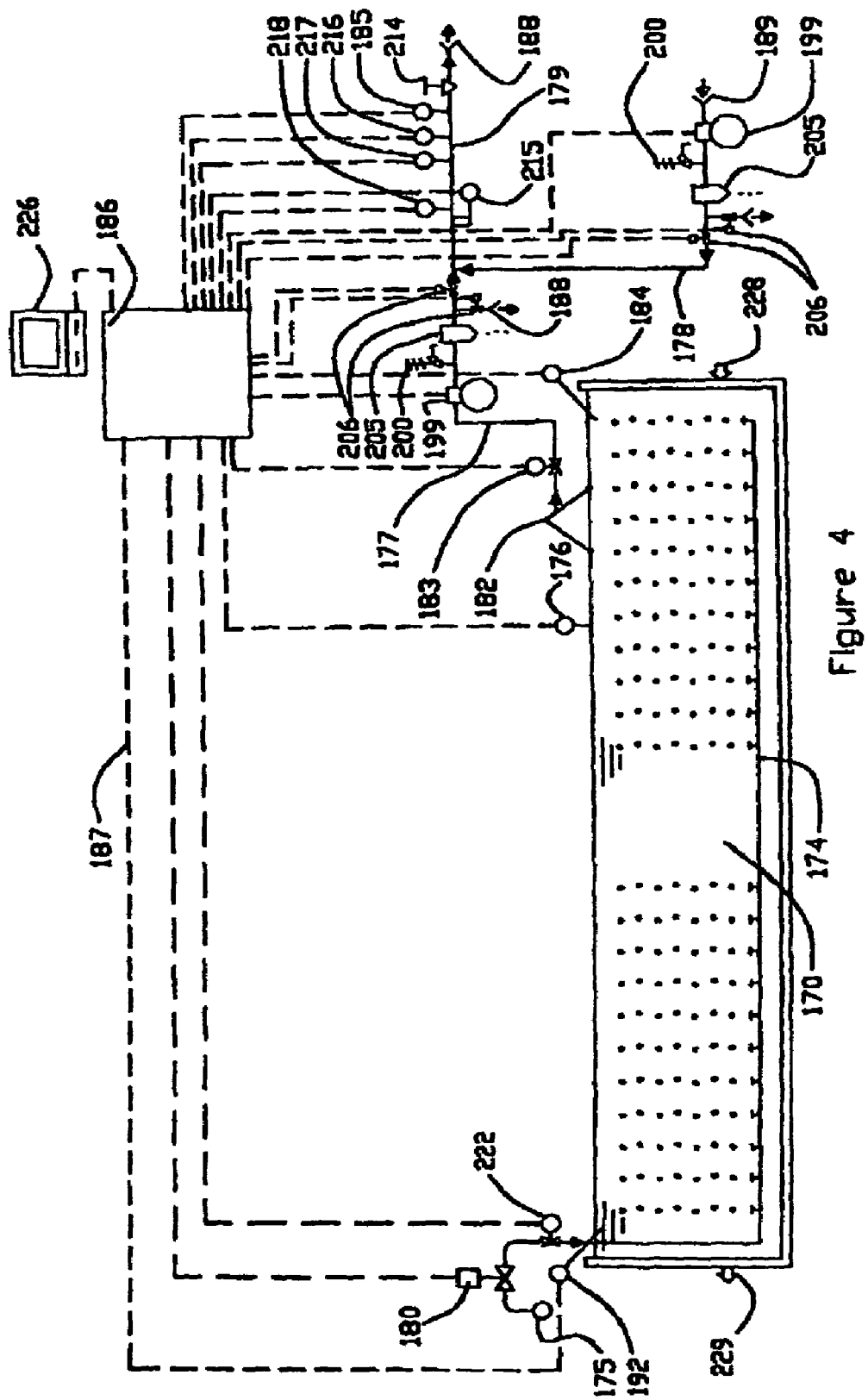
Figure 5:
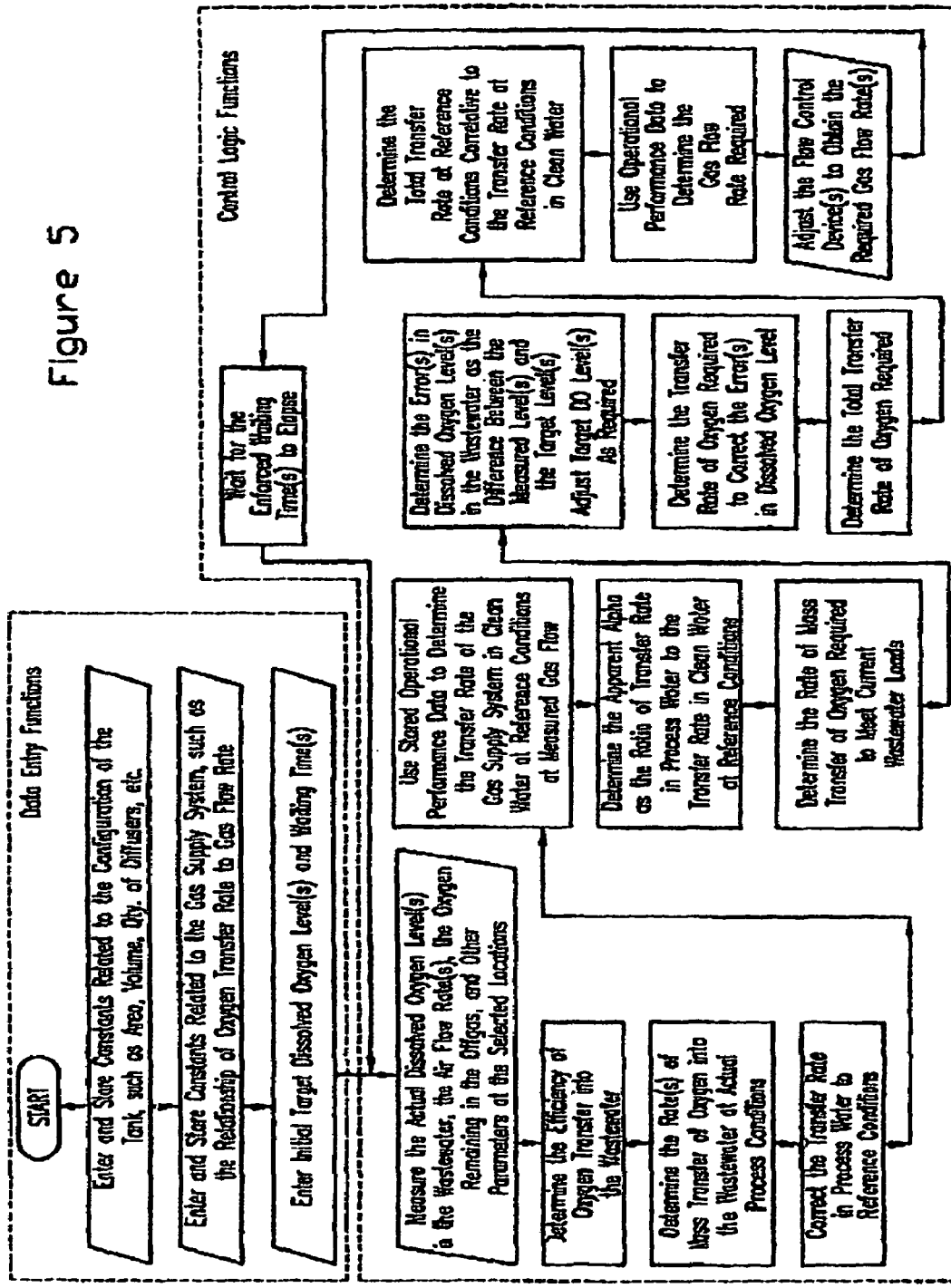
FIG. 5 is a flow sheet illustrating the data entry functions and control logic functions of software useful in practicing the invention.

The embodiment of FIG. 4 will be preferred for many wastewater treatment plants where economic considerations, pre-existing tank configurations, and/or process considerations dictate a system simpler than that shown in FIG. 3 but more complex than that shown in FIGS. 1 and 2. In common with FIG. 1, the embodiment of FIG. 4 has a single tank 170 conducting a suspended growth aeration process, inlet 228 and outlet 229, respectively, for wastewater entry and mixed liquor discharge, and one location for sampling gas escaping from the tank, but two locations for determining DO levels.

In and around tank 170 are components of a gas supply system. Among these are plural devices 174 of any suitable type for introducing oxygen-containing gas bubbles into the wastewater, a source of gas 175, which is shown as a pipe but could be another device, and a gas flow regulating device 180.

In common with FIG. 1, this control system includes sampling lines 177 and 178 and analysis line 179. These lines include or are connected with various items of auxiliary devices or measuring apparatus, discussed below.

Lines 177 and 178 include such auxiliary devices as compressors 199 to provide a positive flow of gas, pressure relief valves 200 to prevent build-up of excessive pressure, drying systems 205 to remove entrained water and water vapor, and valve 206 or some other device to control the direction of gas and/or air flow from various locations, to the atmosphere and/or to the measurement apparatus in proper sequence. Line 178 also includes an ambient air intake 189, for calibrating and verifying the accuracy of the measurement apparatus.

Among the elements of the measuring apparatus in and around the tank are a device 176, for measuring wastewater temperature, and a gas collection member, e.g., a hood 182, connected to sampling line 177, for collecting gas escaping from the tank. Also, line 177 includes a device 183, for measuring gas flow from the hood.

Arranged along analysis line 179 are device 215 which detects moisture or condensate in offgas or ambient gas flow, device 218 which measures gas temperature, device 217 which measures gas pressure, device 216 which measures carbon dioxide content in the off-gas, device 185 which measures oxygen content in offgas, restriction 214 which throttles gas flow to create positive pressure in the measurement apparatus, and an outlet port 188 which discharges sample gas to the atmosphere.

Other elements of the measurement apparatus include device 222 that measures flow from gas source 175 to tank 170 and two DO sensors 184 and 192. These measure the DO level of the wastewater in upstream and downstream portions of the tank, respectively.

Additional elements of the embodiment of the control system include a controller 186, for automatically executing control logic, and connections 187, for transmitting measured values to the controller and control signals from the controller to valve 180. Interface Device 226 is provided to display measured and calculated data and to facilitate entry of constants and control parameters for operating the system.

It is often important to maintain the DO level in a particular portion of a tank at a fixed or substantially uniform level to ensure that the wastewater oxygen demands have been satisfied. Generally, but not necessarily, DO level is monitored for this purpose downstream of the point of entry of the wastewater, near where the wastewater flows out of the tank. The DO level in this portion of the tank can be critical for determination of DO control values. Thus, FIG. 4 shows the downstream DO sensor, device 192, at or near the downstream end of the tank.

However, it is often true, especially in a plug flow operation, that the downstream end of the tank is not the optimum place for gathering data on the oxygen requirements of the process to determine requirements control values. Thus, in this embodiment, other components of the control system of the invention are located elsewhere, typically but not necessarily near the location where wastewater flows into the tank.

Accordingly, in the present embodiment, hood 182 and related control components are positioned near wastewater inlet 228, upstream of the location in the tank at which it is desired to maintain a specific fixed or substantially uniform oxygen level. Sensors used to determine requirements control values, e.g., device 185 to measure the oxygen content in the offgas and device 184 to measure DO at this location, are located in a way that they can determine the oxygen requirements at the upstream location.

Controller 186 uses data from devices 184 and 185 at the upstream location to calculate the varying requirements control values that will satisfy the need for varying amounts of oxygen to support metabolization of waste. The controller also calculates, based on data from DO sensor 192, varying DO control values necessary to maintain specified target DO levels in the downstream location. These requirements and DO control values are combined in the controller to establish varying total gas flow rates for the tank as a whole that are estimated to be necessary for satisfying steady state and dynamic needs for oxygen to support metabolization and DO control needs. Such gas flow rates are used by the controller to establish varying control signals sent to control valve 180 when and as needed to satisfy such needs.

An alternate mode of operation for the apparatus shown in FIG. 4 is to utilize the upstream location for determining both DO control values and requirements control values for the entire tank. In this configuration, referred to as "cascade control", DO control values are calculated from the dissolved oxygen level measured at the upstream location by device 184. The DO target level used for determining DO control values for the upstream location is calculated from DO levels measured at the downstream location by device 192. A mathematical function can be used to establish a relationship between downstream DO levels and upstream DO target levels. For example, one may use a ratio of one level to the other, or a ratio of (a) the difference between a downstream target DO level and downstream measured DO levels to (b) the upstream target level. Alternatively, the upstream DO target level may be increased or decreased as the measured downstream DO level falls below or above the downstream target DO level. From such functions, a controller may calculate DO control values to combine with requirements control values to control gas flow into the tank.

Further embodiments include, among others, a number of tanks, each with a single point of gas flow control, utilizing a single controller and a single set of devices for measuring the characteristics of the gas leaving the process. Each of these tanks may or may not have a separate set of devices for determining downstream DO control values and/or upstream requirements control values.

FIG. 5

FIG. 5 is a schematic software and process flow sheet. Within the data entry functions area, located at the upper left corner of the flow sheet, are three parallelograms identifying data to be entered into and stored in the memory of controllers when the system is set up. This data may be updated from time to time if necessary. Within the control logic functions area is a series of rectangular boxes and parallelograms that identify operations that are performed by the controllers.

A first parallelogram located in the upper left corner of the control logic functions area identifies inputs of data into the controller from sensors in the control system, e.g., wastewater temperature measuring device 5, gas flow measuring device 11 and oxygen content measuring device 13 of the FIG. 1 embodiment. Based on continuous or periodic measurements taken by whatever sensors may be included and active in that embodiment or other embodiments of the control system, the controller generates, on a continuing, e.g., repetitive, basis, varying control values, e.g., requirements control values, DO control values and such other control values as may be desired.

Another parallelogram in the lower right corner of the control logic functions area represents repetitive outputs of the controller to gas quantity regulating apparatus, such as one or more of the valves 1 illustrated in FIG. 1. Such controller outputs represent control inputs from the control system to the aeration process, causing a valve or other device, e.g., valve 1 of FIG. 1, to act in response to such inputs and change or maintain the quantity of gas introduced into the wastewater.

In the present control system embodiments, the controller has a built in or operator selectable waiting time. This is an increment of time that may be selected to elapse between repeated controller outputs and based for example on anticipated or observed system response time(s), and/or the degree of fineness of control desired and/or other considerations. See the box above the third and fourth columns in the control logic functions area. These increments may be of any suitable duration.

Embodiments such as that illustrated by FIG. 5 include provision for correcting, over a selected response time, such errors as may exist in the DO level of the wastewater, thus tending to move the DO level back toward a target value. In such embodiments, waiting time is preferably coordinated with system response time so that the entire response time substantially coincides with or occurs within the waiting time. However, commonly used continuous output controls (such as Proportional-Integral-Derivative) may be employed with or without waiting time without departing from the fundamental principles of the invention.

Persons skilled in the art will understand that the order of a number of the functions in the flow sheet may be rearranged, and that the control system can nevertheless operate successfully. Furthermore, persons skilled in the art will readily perceive that it is possible to design embodiments that involve modification or elimination of some steps in the flow sheet without departing from the fundamental principles of the invention.

In the foregoing preferred embodiments, the varying control values, or components thereof, remain correlative with the varying amounts of oxygen consumption by the biological process. That is, there is an established quantitative relation, present in the control system, between requirements control values and such consumption. This quantitative relation is applied repeatedly by the control system in the determination of changing requirements control values during a given rise and/or fall of such consumption detected by the system. Such repetition preferably occurs during a plurality of consecutive determinations of requirements control values during the given rise and/or fall. Still more preferably, repetition in plural consecutive determinations occurs during a plurality of consecutive rises and falls. However, the above-mentioned quantitative relation may be changed intentionally from time to time, such as by an operator and/or by the control system itself, e.g., by an adaptive controller, to refine the match which the system makes between requirements control values and oxygen consumption.

Additional Embodiments

There are a number of additional embodiments which may optionally be practiced in conjunction with the embodiments described above, or with other embodiments of the invention. These include, by way of example and not limitation:

1) Measuring $O_2$ concentration as % of volume or % of mass directly in an offgas stream.

2) Adding $CO_2$ concentration as % of volume or % of mass measurement to the sample gas stream to increase accuracy of determination of offgas oxygen concentration.

3) Establishment of DO control values related to gas flow required to account for DO error based on the equation:

$$\frac{\Delta DO \cdot V}{t_c} \cdot \frac{1}{\alpha F \cdot \theta' \cdot C'} = \text{Gas Flow Required}$$

Where:
$\Delta DO = DO_{target} - DO_{actual}$
V=Control volume, may refer to the complete tank or part of it
$t_c$=Time constant to establish the time set to correct actual DO to Target DO
$\alpha F$=Apparent alpha value, combined effect of wastewater characteristics ($\alpha$), and gas supply system condition (F), on gas supply system ability to transfer oxygen to wastewater
$\theta'$=Correction factor for effect of wastewater temperature on gas supply system ability to transfer oxygen to wastewater $\theta' = \theta^{(T-20)}$, where T is wastewater temperature
$\theta$=Arrhenius coefficient for wastewater temperature correction factor to account for wastewater temperature effect on oxygen transfer
T=Wastewater Temperature
C'=Correction factor to account for effect of DO levels or Target DO levels on the ability of gas supply system to transfer oxygen to wastewater $$C' = \frac{C^*_{\infty f} - DO}{C^*_{\infty 20}}$$

4) Periodically drawing a sample of ambient air and using the results to correct for drift and calibration error in the offgas $O_2$ concentration and $CO_2$ concentration measurement devices.

5) Using a positive displacement compressor on the sample gas line to maintain constant sample time latency and insure constant sample flow rate.

6) Using pressure and temperature measurement on the sample gas line or hood exhaust line to convert volumetric flow rate to mass flow rate.

7) Using a direct mass flow measurement device to measure mass directly.

8) Adding multiple reactors and hoods to be sampled and wherein control action is determined in a specific sequence by a single controller.

9) Measuring barometric pressure to increase the accuracy of the calculations.

10) Calculating and displaying values derived from measured data that are of use in monitoring reactor performance, including for example:
$\alpha F$, $K_{La}$, airflow/diffuser, SOTR and OUR.

11) Plotting and archiving performance data over time.

12) Providing alarming for excursions in process parameters to indicate equipment failure, process problems, and maintenance requirements.

13) With ambient calibration systems or multiple tank systems, adding solenoid valves to vent gas and allow continuous sample compressor operation.

14) Integrating the control of a single reactor with the control of a complete system and with control of blowers to coordinate all control actions and minimize perturbations.

15) Using a single modulated blower for each reactor instead of multiple reactors drawing gas from a common distribution system.

16) Applying empirically derived constants to the oxygen-containing gas flows to accelerate or decelerate system responses or offset site-specific conditions; for example such constants may be applied to flows determined from DO control values if process considerations require the response time to differ from theoretical values, or to correct short term sags in DO levels.

Preferred Embodiment of Control System Calculations

Further discussion which follows includes a preferred embodiment of bases for calculations that are useful in generating control values and are thus useful in constructing appropriate software or code for the controller. This discussion describes a preferred embodiment of how to control a diffused air aeration gas supply system in such a way so that:
1. Requirements control values are developed in order to satisfy the oxygen requirements of the biological treatment process, and
2. DO control values are developed in order to maintain a pre-established DO concentration at selected locations in the aeration basin.

A number of process variables and conditions are considered and manipulated to allow identification of gas supply system operating settings that will achieve the established objectives.

The basic structure of the preferred control strategy proposed comprises the following steps:
1. Determination of actual oxygen consumption (Oxygen Uptake Rate or OUR) in the tanks, tank, tank zone or other container of wastewater under treatment, also referred to as the reactor;
2. Determination of oxygen transfer characteristics that will affect the ability of the gas supply system to supply oxygen to the process;
3. Establishment of oxygen requirements for the process;
4. Establishment of required gas supply system operating conditions to satisfy the requirements established; and
5. Adjustment of gas supply system operating conditions to established conditions.

Thus, the control system includes elements and devices capable of performing these steps. These steps, and the underlying basis for the method by which this embodiment performs them, will be described in greater detail below.

Determination of Actual Oxygen Consumption in the Reactor (OUR)

The Oxygen Uptake Rate (OUR) of mixed liquor is determined using off-gas analysis and typically is useful in establishing requirements control values within the control system. This methodology allows using at least a portion of the activated sludge reactor itself as a respirometer, with performance on a continuing basis of gas phase mass balances of oxygen across a selected control volume, to determine the amount of oxygen introduced by the gas supply system, and with performance on a continuing basis of liquid phase mass balance of oxygen across the same control volume, to identify how much of the oxygen introduced by the gas supply system is being consumed by microorganisms in the wastewater.

The control volume could be the entire liquid-containing volume of the reactor, but is conveniently a selected small portion of the total volume selected to provide the most useful or convenient information for control purposes. By way of illustration and not limitation, consider a plug flow tank measuring about 20 meters (width) by 100 meters (length) by 5 meters (water depth) or more. In such a tank, one might select a control volume which, by virtue of its location in the tank, would be reasonably representative of the process performance of the reactor. For example, one might choose a position centered on the longitudinal centerline of the tank, about 24 meters from the tank upstream end and, being about 1.2 meters (wide) by 2.4 meters (long) horizontally and extending vertically throughout the depth of the wastewater in the tank.

Liquid phase mass balance involves a variety of physical, chemical and biochemical processes that take place simultaneously. Dissolved oxygen enters and leaves the control volume as a consequence of water flowing in and out of this volume. Because water may contain oxygen (in the form of dissolved oxygen), such water entering the control volume will represent an input of oxygen to the control volume, and water exiting the control volume, with whatever DO concentration is present in it, will represent an oxygen output. Other oxygen inputs may have to be considered, such as those due to operation of aeration devices, or, in the simplest example, by charging pure oxygen into the control volume. Biological activity in the biomass responsible for treatment of the wastewater uses up some or all of the oxygen available in the tank. When establishing a liquid phase mass balance of oxygen across a control volume, oxygen consumed by the biomass will no longer be present in the liquid and may therefore be considered as an oxygen output from the control volume. Any other sources of oxygen output should also be considered when formulating this mass balance, for example oxygen output sources such as those due to reactions that may occur, such as following the addition of an oxidizing agent. However, in diffused air aeration plants, oxygen input due to transfer occurring in the liquid surface-atmosphere interface in open air aeration tanks is assumed to be a negligible fraction of the transfer taking place below the liquid surface.

Thus, this embodiment provides a mass balance formulation in which oxygen input and output via water flowing into and out of the control volume, oxygen input due to gas supply system operation, and oxygen output from oxygen consumption by the biomass and dissolved oxygen inventory in the control volume need to be considered.

In those cases where the total oxygen inputs to the control volume are greater than the total oxygen outputs, a net increase of oxygen occurs in the control volume, and an increase in the total oxygen inventory in the control volume is observed. Similarly, when the total oxygen outputs are greater than the total oxygen inputs, a decrease in the total oxygen inventory will be observed.

When this mass balance is conducted on a control volume over a certain period of time, a given term in the mass balance relationship (whether it be, for example, an oxygen input or an oxygen output to or from the control volume) may be determined if all the remaining terms are of known value.

Under these circumstances, absent any other oxygen input or output source, biomass oxygen consumption may be determined if the oxygen input by the gas supply system, the net oxygen input (of positive or negative value) due to oxygen contained in incoming and outgoing control volume water flows and the net change (of positive or negative value) in control volume of dissolved oxygen inventory are known or measured.

Whenever these principles are applied to a full depth section or portion of an aeration tank located at a significant distance from the tank vertical walls, one may picture the control volume as a limited portion of the tank volume having imaginary vertical boundary surfaces that run all the way from the bottom of the tank to the liquid surface. No water enters through the bottom (tank bottom) or top of the control volume, and all water flows enter or leave the control volume through its side boundaries. Assuming the control volume embraces a relatively small portion of the horizontal dimensions of the tank, whereby the dissolved oxygen levels would be expected to vary little from one side of the volume to the other, no significant changes in the oxygen content of the control volume would be expected to occur as a result of imbalance between incoming and outgoing water flows, so these flows may be treated as the same. All water flows enter the control volume from regions just outside an imaginary boundary and all the outgoing flows depart from regions just inside such a boundary. Because this boundary does not physically exist, it may be assumed that liquid characteristics at both sides of the boundary are the same. If this assumption is applied to dissolved oxygen content in the liquid, it may be assumed that dissolved oxygen at both sides of the boundary is the same. If the boundaries of the control volume do correspond or partially correspond with physical boundaries, e.g., a tank wall with a small opening or an communicating pipe, this assumption may not be applicable.

In those cases where the assumption as to imaginary boundaries is applicable, the net oxygen input associated with liquid flowing into the control volume and liquid flowing out of the control volume is of the same value under steady state volume conditions and, thus, dissolved oxygen concentrations in incoming and outgoing flows are the same. Therefore, the net oxygen input due to interchange of liquid between the control volume and the rest of the aeration tank is zero.

Under these circumstances, the only remaining terms in the mass balance are the oxygen input due to gas supply system oxygen transfer, the oxygen output associated with oxygen consumption by the biomass, and the net change (of positive or negative value) in the control volume dissolved oxygen inventory.

Whenever arrangements are made so that conditions for the application of the described procedure are met, the amount of oxygen being consumed by the biomass over a certain period of time may be determined from the gas supply system oxygen transfer and the net change in control volume dissolved oxygen inventory.

The net change in control volume dissolved oxygen inventory may be derived from dissolved oxygen measurements at the beginning and end of the time period during which a mass balance is performed and the control volume.

The determination of the Oxygen Transfer of the gas supply system is done with a second mass balance on oxygen (gas phase mass balance) for the selected control volume. This mass balance is based on the idea that, in the absence of any other gas phase oxygen inputs and outputs, whatever amount of oxygen is depleted from the gas is equivalent to the oxygen dissolved into the liquid (oxygen transferred to the liquid).

Therefore, oxygen transfer may be determined from analysis of gas entering and gas leaving the system.

One approach to this task is to measure the oxygen entering the system in the aeration gas and the oxygen leaving the system in the offgas by measuring the gas flow and oxygen content of the incoming gas and the gas flow and oxygen content in the offgas.

Another approach to this task involves assuming that both the Incoming volumetric gas flows and outgoing volumetric offgas flows are of the same value as a consequence of no net changes of gas volume in the system (gas volume in the system remains constant with time).

A suitable way of determining the amount of oxygen present in both the incoming and the outgoing gas streams could be to compare the oxygen present in each gas stream with other components present in each gas stream that remain constant through the process. By way of example, if the aeration gas used contains a certain portion of gas A that is not transferred to the liquid and does not react with the tank contents (inert), then both the incoming gas stream and the outgoing gas streams would show the same content of gas A. Gas A is conserved during the process.

In order to do so, it may be necessary to measure the carbon dioxide and water vapor content of the incoming and outgoing gas streams.

Oxygen depletion in the gas phase or oxygen transfer to the liquid phase may then be expressed as a percentage reduction in oxygen content in the gas stream by comparing the difference between the molar ratios of oxygen to inerts in the incoming and outgoing streams to the molar ratio of oxygen to inerts in the incoming stream.

Whenever this approach is followed, the percentage oxygen transfer determined (Oxygen Transfer Efficiency) may be combined with oxygen input rate data to determine Oxygen Transfer Rate. By way of example, the mass of oxygen transferred may be determined from the percentage oxygen transfer observed and the mass flow of oxygen introduced into the system. In many instances it may be convenient to express mass balance equations in terms of rate units (oxygen transfer rate, oxygen uptake rate, and net oxygen inventory change rate) instead of mass units.

Exemplary Variables Involved $OI_{to}$=Oxygen inventory in a control volume at the beginning of the time period during which a liquid phase oxygen mass balance is performed $OI_{tmb}$=Oxygen inventory in a control volume at the end of the time period during which a liquid phase oxygen mass balance is performed OTE=Oxygen Transfer Efficiency OTR=Oxygen Transfer Rate OUR=Mixed Liquor Oxygen Uptake Rate $O_{2conc}$=Concentration of Oxygen in Oxygen containing gas Q=Oxygen containing gas volumetric flow into the control volume $t_{mb}$=Time constant set to establish the period of time during which a liquid phase oxygen mass balance is performed V=Volume, may relate to the complete tank or part of it Values associated with these variables within the control system may be stored in or developed by the control system with the aid of data within the system or acquired from external sources.

Determination of Oxygen Transfer Characteristics

The information gathered during the calculations conducted to determine OUR may also be used to assess the oxygen transfer characteristics of the system studied if appropriate data are available. In order to do so, some relationship between the Oxygen Transfer of a gas supply system in process conditions and the Oxygen Transfer of the same system under known conditions may be used.

In the aeration industry, oxygen transfer of gas supply systems and devices is commonly expressed in relation to a set of reference operating conditions to allow comparison of different equipment under equivalent conditions. This is due to the fact that gas supply system oxygen transfer depends on factors such as ambient conditions (barometric pressure and water temperature amongst others), water characteristics (composition, etc.) and dissolved oxygen concentration in the aeration basin that would make data from different aeration devices very hard to compare unless operating under similar (if not exactly the same) conditions.

When comparing oxygen transfer of a gas supply system operating under process conditions with oxygen transfer of the same system under reference conditions (Standard Conditions), a number of correction factors are preferably introduced to account for the different effect of different operating conditions on system performance.

In addition, tests at reference conditions are usually conducted on new gas supply systems, so in those cases where oxygen transfer of a gas supply system may be influenced by gas supply system condition (new versus used systems), another correction factor can be introduced to account for the effect of gas supply system condition on oxygen transfer.

Correction factors for ambient conditions such as water temperature, barometric pressure and water temperature have been documented in the literature and widely accepted and extensively used in the past.

However, due to the difficulty of establishing a relationship between wastewater characteristics and composition and its effect on oxygen transfer, no widely accepted correction factors have been established for the determination of oxygen transfer of a gas supply system in wastewater compared to its performance under reference conditions, e.g., in potable water.

If ambient condition correction factors are used in combination with the values of the parameters involved in the above-mentioned corrections, some of which may require measuring and others of which may be assumed, a relationship between the oxygen transfer of the gas supply system as measured in process conditions and the oxygen transfer of the same gas supply system under standard conditions could be developed in which all terms in the relationship would be known (measured or calculated) except the effects of (a) wastewater characteristics and (b) gas supply system condition. Therefore, even if the individual values of these two parameters were not identified, their combined effect could be determined. Once this effect has been determined (apparent alpha), a relationship between standard conditions gas supply system oxygen transfer and process conditions gas supply system oxygen transfer, where all correction factors are known or established, could be developed and be useful in establishing gas supply system performance control values.

Determination of the oxygen transfer characteristics of the gas supply system and mixed liquor of the process involves measuring both the wastewater temperature in the control volume and the Dissolved Oxygen in the mixed liquor. Although $C^*_{\infty f}$ can be calculated from measured values such as Barometric Pressure, Wastewater Temperature and Salinity Correction factor β, its small variation suggests the possibility of using built in relationships, meaning that the control system could operate successfully on the basis of fixed values for $C^*_{\infty f}$ stored or introduced temporarily into the control system. Thus, a control system built according to this embodiment of this invention will include one or more DO (dissolved oxygen) sensors and one or more temperature sensors, as will be discussed below in conjunction with the accompanying drawings.

Exemplary Variables Involved

α=Effect of wastewater characteristics on gas supply system ability to transfer oxygen into wastewater αF=Apparent alpha value, combined effect of wastewater characteristics (α), and gas supply system condition (F), on gas supply system ability to transfer oxygen to wastewater β=Correction factor for the effect of salinity on dissolved oxygen saturation concentration $C^*_{\infty 20}$=Dissolved oxygen saturation concentration at 20° C., 1 atm $C^*_{\infty f}$=Dissolved oxygen saturation concentration in field conditions DO=Mixed liquor dissolved oxygen $K_{La}$=Apparent volumetric mass transfer coefficient F=Effect of gas supply system condition (often associated to diffuser fouling/aging) on gas supply system ability to transfer oxygen OTR=Oxygen Transfer Rate P=Barometric Pressure SOTR=Oxygen Transfer Rate at Standard Conditions (20° C., 1 atm, 0 DO, clean water)

θ'=Correction factor for effect of wastewater temperature on gas supply system ability to transfer oxygen to wastewater, $\theta'=\theta^{(T-20)}$, where T is wastewater temperature θ=Arrhenius coefficient for wastewater temperature correction factor to account for wastewater temperature effect on oxygen transfer T=Wastewater Temperature Values associated with these variables within the control system may be stored in or developed by the control system with the aid of data within the system or acquired from external sources.

Establishment of Oxygen Requirements

As previously mentioned, in the present embodiment of the invention, the approach taken in the control system for determining the oxygen requirements of the biological process the system at any point in time includes satisfying the oxygen requirements of the biological treatment process and maintaining a preestablished or target DO concentration at one or more selected locations in the process mixed liquor.

Although determination of the oxygen requirement of the biological treatment process has been discussed above, the present embodiment also determines the oxygen required to keep the process at a preestablished DO concentration as a function of the actual process conditions with respect to the preestablished conditions (DO target level). Whenever actual process conditions match the preestablished target conditions, both objectives of the control strategy are met. The process is taking up oxygen at the rate at which it is being supplied and operates at the desired dissolved oxygen level.

However, if the actual process conditions differ from the target conditions, a difference between the actual DO concentration at the selected control point in the mixed liquor and the target DO concentration at that same control point is observed. This may happen because the DO in the aeration basin is higher than the target value or lower than the target value. In both cases, DO control values should be developed and corrective actions implemented to return DO levels to target DO levels. If only the higher or lower amount of oxygen required by a change in biomass consumption of oxygen were supplied, the difference observed as to the DO level in the process versus the DO target level would remain present. An additional amount of oxygen should be supplied when process DO is lower than target DO, and a lesser total oxygen supply than that required by biomass consumption should be supplied when process DO is higher than target DO.

The needed increment of increased or decreased oxygen supply, above or below that required to meet current biomass requirements may be determined by establishing a relationship between observed process conditions and target process conditions. This may be done by considering the dissolved oxygen inventory in a selected control volume around the target DO control location. More particularly, the control system determines how much dissolved oxygen would be present in the mixed liquor if the target DO were achieved and how much DO is actually present in the same volume. The difference between these two quantities, positive or negative, is then added or subtracted by the control system from the amount of oxygen required for biomass consumption.

Because oxygen requirements are usually expressed as rates, the result of this DO inventory, i.e., the total mass of oxygen to be added or subtracted from biomass requirements, will usually be converted into an oxygen supply rate required to return DO to the target value over a selected time period. Introduction of a time parameter establishes the speed at which the DO level will be returned to the target value.

Target DO refers to a selected level of DO which the operator wishes to maintain at a selected control location and $t_c$ refers to a time constant, the period of time in which it is desired to return DO to the target DO level. ΔDO refers to the difference between the target DO and the mixed liquor DO (dissolved oxygen content of the wastewater) for the selected control location.

Exemplary Variables Involved

DO=Mixed liquor dissolved oxygen

ΔDO=Difference between target dissolved oxygen concentration and actual dissolved oxygen concentration at a selected location $DO_{target}$=Target DO concentration for a selected location $t_c$=Time constant to establish the time set to correct actual DO to Target DO V=Volume, may relate to the complete tank or part of it Values associated with these variables within the control system may be stored in or developed by the control system with the aid of data within the system or acquired from external sources.

Determination of Gas Supply System Required Operating Conditions

Once the oxygen requirements needed to meet established goals is determined, the relationship between gas supply system oxygen transfer in process conditions and gas supply system oxygen transfer in standard conditions, developed as described above, is used by the control system to determine the standard conditions oxygen supply required by the process.

Data available on standard condition performance of the gas supply system, which data may be stored in or developed by the control system with the aid of data within the system or acquired from external sources, may then be useful in determining gas supply system operating conditions and performance control values required to achieve the desired oxygen supply.

Exemplary Variables Involved

The following is a key to certain expressions used in the above description and in the measurement and calculation of process variables:

α=Effect of wastewater characteristics on gas supply system ability to transfer oxygen into wastewater αF=Apparent alpha value, combined effect of wastewater characteristics (α), and gas supply system condition (F), on gas supply system ability to transfer oxygen to wastewater β = Correction factor for the effect of salinity on dissolved oxygen saturation concentration $C^*_{\alpha 20}$ = Dissolved oxygen saturation concentration at 20° C., 1 atm $C^*_{\alpha f}$ = Dissolved oxygen saturation concentration in field conditions DO = Mixed liquor dissolved oxygen $DO_{target}$ = Target DO concentration for a selected location F = Effect of gas supply system condition (often associated to diffuser fouling/aging) on gas supply system ability to transfer oxygen OUR = Mixed Liquor Oxygen Uptake Rate Q = Oxygen containing gas volumetric flow into the control volume ROTR = Total Required Oxygen Transfer Rate under process conditions SOTR = Oxygen Transfer Rate at Standard Conditions (20° C., 1 atm, 0 DO, clean water)

θ' = Correction factor for effect of wastewater temperature on gas supply system ability to transfer oxygen to wastewater, $\theta' = \theta'^{(T-20)}$, where T is wastewater temperature θ = Arrhenius coefficient for wastewater temperature correction factor to account for wastewater temperature effect on oxygen transfer T = Wastewater Temperature Values associated with these variables within the control system may be stored in or developed by the control system with the aid of data within the system or acquired from external sources.

Adjustment of Gas Supply System Operating Conditions

All of the steps described in previous sections cover the different procedures and methods used to establish the aeration operating conditions required to achieve the control goals established.

Once individual SOTR values applicable to one or more control volumes and/or complete tanks are established, the control system uses this information to adjust gas supply system parameters and devices, using the correlation between gas supply system performance at process conditions and at standard conditions. In most cases, gas supply system operating conditions can be defined as a function of individual/total gas flows to each control zone/complete tank.

DEFINITIONS

"Adjust" or "adjustment" refers to: modifying data from a measuring device or control signals from a controller, including for example a change in magnitude and/or conversion to a different form. These terms also refer to altering one or more biological process parameters and altering one or more conditions of some part of the biological process equipment and/or of the control system. Usually, such altering is in response to some indication of need, which may be a changing need for oxygen-containing gas, such as the need for gas consumed in the biological process, and/or the need for gas to change a DO level and/or the need for gas occasioned by changes in gas supply system performance. Such altering may occur on a continuous or intermittent basis. In some instances, alteration can occur in such a way that the full amount of corrective action required to meet one or more needs occurs immediately, when the control system senses the need. In other instances, alteration can occur over a period of time, in increments. For incremental alterations, it is not possible to state for all situations the absolute minimum proportion of the corrective action that must be applied in the first and subsequent increments. Biological treatment plants can vary widely in their time of response to corrective actions. When the invention is embodied in ways that involve continuing but incremental alteration, system wait times can vary widely. However, alterations can occur in increments representing a small proportion of the total corrective action desired when wait times are short and/or plant response time is long. Conversely, larger increments may be required when wait times are long and/or plant response times are short. Armed with this understanding and their experience with plant operations, persons skilled in the art can determine, without undue experimentation, what proportion of the total corrective action should be applied in the respective increments, so that there will be a sufficient amount of corrective action per increment to prevent changing needs from frequently or seriously out-running the control system.

"Aerobic biological process" means any of a variety of biological processes, one or more portions of which are supported, at least in part by the introduction of oxygen containing gas into wastewater in order to create an aerobic environment. Prominent examples of these processes exist in a wide variety of continuous and discontinuous configurations of the activated sludge process involving a variety of flow regimes. Examples include plug flow, complete mix and step feed aeration. Submerged aerated filters and other batch processes are contemplated in which the wastewater is aerated for all or a portion of the operation cycle for each batch.

"Amount", as applied to any given tangible or intangible thing, including without limitation materials, data and signals, refers to a quantity of that thing or a quantity relationship between that thing and another tangible or intangible thing. Such quantity or relationship may be expressed in any unit or units or without units. For example, an absolute quantity may be expressed in units of, e.g., mass or volume. A relative quantity may be expressed, e.g., as units of the given thing per unit time (rate) or per unit volume or mass of another thing, or as a ratio between different things which, e.g., are expressed in the same kinds of units, so that the nature of the units may be ignored.

"Approximate" means that there is a degree of correlation between values which, whether perfect or imperfect, is sufficient to be useful in controlling a wastewater aeration process in accordance with the invention.

"Biological process" means any wastewater treatment process which, at least in part, involves the metabolization by bacterial action of waste material dissolved and/or suspended in wastewater, that encompasses, among others, one or a combination of aerobic, anoxic, and anaerobic steps or processes.

"Composition", as applied to a gas, refers to the identities of at least a portion of the gases in a mixture of two or more different gases, or to the relative amounts of two or more gases in such a mixture, or to the amount of a single gas in such a mixture.

"Connected with" means having a tangible or intangible operational connection, whether direct or indirect, including such tangible forms of connection as dedicated wires, electric power lines and wiring systems, intranet or internet connections, telephone lines, fiber-optic cables, connections on circuit boards and pneumatic signaling lines, and such intangible forms of connections as radio waves, laser and other light beams, and sound waves, by which control system resources such as data, control signals or outputs, control inputs and code may pass between cooperating components of the control system, e.g., measuring devices, controllers and flow regulating devices, whether such components are located close to or distant from one another.

"Consumption of oxygen . . . in the biological process" refers to oxygen that is consumed, e.g., by bacteria or other means, in removing from the wastewater and/or in otherwise acceptably altering, e.g., by metabolization and/or by other mechanisms, carbonaceous, and/or nitrogenous and/or other forms of waste; this language is intended to distinguish process oxygen needs from deficiencies and excesses in the supply of oxygen to the wastewater which manifest themselves as decreases and increases in the DO level of the wastewater.

"Continuing", for example as in the exercise of continuing control or the taking of continuing measurements, refers to actions taken on a continuous basis or on an intermittent but repetitive, including a periodic or irregularly repeating basis.

A "controller" is any device which is or includes one or more logic devices, and is able, whether alone or in combination with one or more other devices, to interpret values correlative with one or more parameters of the biological process and to establish control values.

The controller may for example be at least in part, including wholly, one or more mechanical devices and/or one or more electrical and/or electronic devices. Thus, the logic of the controller may for example reside at least in part in one or more mechanical relationships in mechanical devices, electrical relationships in electrical and/or electronic devices, and/or in any combination of the foregoing.

The controller preferably includes or at least has access to appropriate software or code to interpret data on process conditions gathered from measurement apparatus and establish the control values. In a preferred embodiment, the logic resides at least in part, which may include wholly, in one or more elements of code temporarily present or stored in one or more co- or remotely-located programmed or programmable devices.

Controllers used in the invention may be specialized units of limited but sufficient computing capacity, or may be a general- or special-purpose computer or computers of considerable computing capacity. The controller is preferably capable of executing basic control instructions (e.g., Boolean logic and four function math) such as those commonly available through (but not limited to) computer or personal computer (PC) based control platforms, programmable logic controller (PLC) based control platforms, or distributed control systems (DCS) based control platforms. Proportional, proportional-integral (PI) and proportional-integral-derivative (PID) controllers may be used. See, e.g., "Process Instruments and Controls Handbook", 3d Ed., McGraw Hill.

The controllers may also include memory devices, as well as comparators, other devices and/or code that adjust, refine, correct, condition or otherwise assist by performing auxiliary functions, such as tuning the control system and/or processing data, control values and control signals. Thus, adaptive (self- or auto-tuning) or non-adaptive controllers may be used.

In effect, the controller defines, for the varying amounts of biological consumption of oxygen that occur in the process, control values, or components of control values, that change in response to, while remaining correlative with, such varying amounts of oxygen consumption. Put differently, the controller generates varying control values which have, or which respectively include at least one component that has, on a continuing basis, an at least approximate quantitative relationship with the varying amounts of oxygen consumed by the biological process.

Control values generated by the controller, with or without intermediate adjustment, are useful for acting on the process, or on items such as valves or other control elements associated with it, to alter or maintain operation of the process in a way that generally limits or minimizes deviation of one or more process variables from desired performance, for example from established set points. Control values of more than one type, e.g., respectively corresponding with more than one process need, may be combined within the controller, e.g., to generate a single control signal involving plural components. Optionally, control values that respectively represent different process needs may be generated but kept separate within the controller and used to issue separate control signals to different control elements.

Correlative with", as applied to a relationship between first and second values, means that, regardless of whether or not they are numerically equal or precisely related, there is at least an approximate quantitative relationship between them, a sufficient degree of relatedness so that they or at least one of them can serve as a practical basis for control over the process. The magnitude of one or more of the values may be affected by its inclusion of one or more parameters, usually small enough to be ignored, that are not part of the relationship on which the correlation is based. In embodiments of the invention in which a first value is correlative with but not numerically similar to a second value, the first value may be functionally related to the second in such a way that the first may be used as an at least approximate indicator of the other. Any useful functional or other type of relationship between the values will suffice. The relationship may take any useful form. For example, one value may be directly proportional to the second. Or the first may be related to the second by a fixed or variable difference. Or the first may be related to the second through an equation or table of values. Values of all kinds are included, for example Oxygen Transfer Rate vs. Gas Flow, and Oxygen Transfer Efficiency vs. Gas Flow. In the case of control values, "correlative with" preferably refers to a relation between (a) an applied control value applied by the system in relation to a particular process control needs, e.g., process oxygen needs, DO level control needs, performance control needs or a combination of process control needs and (b) a reference control value which would adjust operation of the biological process in a way that would precisely satisfy the particular need or needs; in such relation, the applied control value, whether applied in one or a plurality of increments, approximates the reference control value. The adequacy of this approximation will be expressed in conventional usage as a percentage difference between the control value and the reference value, said difference being plus or minus 20%, more preferably plus or minus 10%, still more preferably plus or minus 5%, and most preferably plus or minus 3%. Notwithstanding this conventional usage, as the reference value nears the upper and lower bounds of the useable range it may be more convenient or more accurate to express the adequacy of this approximation as a finite difference, e.g. plus or minus 0.10 ppm or plus or minus 25 cubic meters per hour.

"DO control values" or "dissolved oxygen control values" refer to measured and calculated parameters correlative with the amount of oxygen required to move a DO level (including positive oxygen or zero oxygen conditions) observed in the process to or toward a target DO level.

"Gas collection member" means a device comprising a confined chamber for receiving from wastewater and substantially isolating from the atmosphere at least a portion of the gas bubbles that have been released into wastewater by a gas supply system and have traveled upward in the wastewater for at least a portion of its depth but have not been dissolved in the wastewater. A typical but non-limiting example would be a hood, rectangular in plan view and triangular in transverse cross-section, having an open bottom; except for inlets and outlets associated with its control function, it is otherwise gas tight and is equipped throughout the periphery of its lower edges with floats to support it at the surface of wastewater. Gas collection members need not however be located at the wastewater surface, since they can perform their receiving and isolating functions if positioned beneath the surface or if positioned above the surface and provided with dependent skirts extending, throughout their periphery, in a direction down toward and preferably to a position beneath the surface.

"Gas supply system" includes any bubble-forming device or devices of widely varying type, shape and size that is/are suitable for transferring the oxygen of an oxygen containing gas to wastewater in the context of a biological treatment process, for example area release fine bubble diffusers, draft tube aerators, mechanical aerators, brush aerators and coarse bubble diffusers, along with the necessary accessory equipment to support the operation of the bubble forming device or devices and deliver the gas thereto, including gas supply conduits, manifolds, support stands, downcomers, yard piping, valves, filters, positive displacement compressors, turbocompressors, or centrifugal blowers and related compressor/ blower control and gas flow control devices. Illustrative area release fine bubble diffusers include those in the form of tubes, disks, domes and sheets, whether of elastomeric, ceramic or fibrous material. Examples of coarse bubble diffusers include hood, nozzle, orifice, valve and shear devices.

"Indicative" refers to the quality of indicating a given value numerically equally or, if not numerically equally, at least through a functional or other relationship, such indication being a precise value so far as can be determined by observation or calculation from the data available in the system or, if not such a precise value, deviating from the precise value by an amount insufficient, taking into account the intended use of the indication, to destroy its usefulness for effecting control over the biological process. In a preferred embodiment, the indication is within +/−20%, or +/−10%, or +/−5% or +/−3% of said precise value.

"In response to" refers to direct and indirect stimulation of an action or condition by another action or condition; for example a control element acts in response to a control signal when such action is a direct or indirect result of the control signal, whether the signal is received directly or indirectly from a controller with or without modification or conversion to a different form.

"Mixed Liquor" refers to the contents of a tank comprising at least wastewater and biomass.

"Oxygen-containing gas" includes any gas, including mixtures of gases with or without entrained or dissolved vapors, for example air, oxygen, ozone, any other gas and mixtures of any of these, that is suitable to support an aerobic biological process or process step for the treatment of wastewater, such as a suspended growth aeration process and preferably a process that includes one or more activated sludge processing steps.

"Oxygen Uptake Rate" (OUR) refers to the time rate of consumption of oxygen in the wastewater, and includes components such as biomass oxygen consumption, other forms of oxygen consumption, chemical reactions, and other factors.

"Performance parameters" refer to measured, calculated, or predetermined values that are correlative with changes in performance or efficiency of any device or process in the system.

"Provide" or "Providing" means making available in any manner for use in the control system for any useful period. For example, as applied to code or data, the definition includes making same available from within or without the system, from a source at or remote from the site at which the biological process is conducted, by generating same in the system, and/or by manually inputting same into the system, and/or by storage of same in the system, whether or not the storage location is within the system and whether or not storage is brief or long term, with or without being updated from time to time.

"Repetitive" means repeated at a time interval of any length which is useful in effecting control of an aeration operation in the context of the invention, for example, at intervals of up to about 8 hours, more preferably up to about 1 hour and still more preferably up to about 5 minutes. These intervals may be as short as a very small fraction of a second, e.g., about 0.01 second or more, preferably about 10 seconds or more and more preferably about 30 seconds or more.

"Requirements control values" refers to measured and calculated parameters correlative with the oxygen required to satisfy the usage of oxygen in the biological process. These may include but are not limited to all factors related to oxygen uptake rate (OUR) in both steady state and non-steady state conditions.

"Suspended growth aeration process" means an aerobic biological process in which oxygen containing gas usually assists in mixing the wastewater, and still more preferably, assists in maintaining the bacteria in suspension.

"Tank" refers to one or more suitable natural and/or man-made water impounds which may be of widely varying type, shape and size. Thus, the tank or tanks may be earthen- or plastic-lined, but are preferably of steel or concrete and are of any suitable shape when viewed in plan view or vertical section. For example, the tanks may have a circular, annular, oval, square or elongated rectangular shape in plan view. The term tank also applies to a section of a tank that has been segregated from one or more other portions of that tank by a baffle and/or other form of length divider so that the segregated section responds substantially independently of the other section or sections to control inputs. Preferred are tanks in which their dimensions in the direction of wastewater flow, whether in a straight line or not (L), are greater than their dimensions perpendicular to such direction (W), in which L/W may, e.g., be greater than 3, 5, 10 or 15, such as tanks of annular or elongated rectangular shape. Preferably, at least the aerobic portions of the tanks will be equipped with any suitable gas supply system.

"Values" are representations of (a) quantities, expressed in any suitable unit or combination of units, such as units of mass, volume, pressure, time, electrical potential, resistance or other units, or expressed as unitless numbers, or of (b) conditions, e.g., "on", "off", "above", "below", "equal to" and others. The results of measurements are usually expressed as values.

"Wastewater" refers to the wastewater undergoing treatment at any stage in a biological process, encompassing among others raw wastewater, wastewater after preliminary treatment, mixed liquor and other mixtures of wastewater and biomass.

The invention claimed is:

1. A method of exercising continuing control over an oxygen-consuming biological wastewater treatment process in which the need for oxygen repeatedly increases and decreases and which is conducted in a plurality of wastewater treatment plant processing tanks in cooperation with a gas supply system to supply oxygen-containing gas bubbles to, and dissolve oxygen in, the wastewater in at least one of said plant processing tanks and a control system comprising at least one flow control element to supply an increasing and decreasing flow of oxygen-containing gas through the gas supply system into the wastewater in the at least one plant processing tank, at least one gas collection member and gas detector to provide off-gas data correlative with changing amounts of one or more gases in offgas from the wastewater, a controller to process the offgas data and cause the flow control element to increase and decrease the flow of oxygen-containing gas into the wastewater in said tank or tanks, and wherein the control system is programmed to tend to maintain a positive DO level in at least a portion of the at least one tank which method comprises:

providing in the control system DO (dissolved oxygen) data correlative with varying DO levels in the wastewater and/or performance data correlative with varying ability of the gas supply system to dissolve oxygen in the wastewater, generating control values in the control system derived at least in part from (a) the offgas data and (b) the DO data and/or performance data and using such control values to generate control signals to cause the at least one flow control element to cause varying flows of oxygen-containing gas through the gas supply system and into the at least one processing tank that are correlative with the varying consumption of oxygen by the biological process adjusted to cause wastewater DO levels to move toward, return to or be maintained at a target value and/or compensate for the varying ability of the gas supply system to dissolve oxygen in the wastewater.

2. A method according to claim 1 comprising generating control values in the control system derived at least in part from the offgas data, DO data and performance data and using such values to generate control signals to cause the at least one flow control element to provide flows of oxygen-containing gas into the at least one plant processing tank reflecting process oxygen needs adjusted to (a) cause wastewater DO levels to move toward, return to or be maintained at a target value and (b) compensate for the varying ability of the gas supply system to dissolve oxygen in the wastewater.

3. Method according to claim 1 wherein the biological process comprises suspended growth aeration which includes biological metabolization of suspended and/or dissolved waste material present in the wastewater.

4. Method according to claim 1 wherein the controller contains or has access to tables of data, with the aid of which it defines said control values.

5. Method according to claim 1 wherein the control system operates as a feed forward controller wherein control outputs are generated, at least in part, based on requirements control values and performance control values.

6. Method according to claim 1 wherein said control values comprise plural control value components combined within the controller to generate one or more control signals.

7. Method according to claim 6 wherein said control values comprise, as component parts thereof, requirements control values combined with DO rate of change values and DO control values.

8. Method according to claim 1 comprising providing gas supply system operational performance data in the control system.

9. Method according to claim 1 comprising providing gas supply system performance standard data in the control system.

10. Method according to claim 9 comprising providing gas supply system relative system performance data in the control system that is derived at least in part with performance standard data.

11. Method according to claim 1 wherein DO levels in the wastewater differ positively and/or negatively from a target DO value and the system generates DO control values and control signals which are sufficient, when applied in conjunction with requirements control values generated by the system, to at least partially offset deviations of the DO levels from the target DO value.

12. Apparatus for exercising continuing control over an oxygen-consuming biological wastewater treatment process in which the need for oxygen repeatedly increases and decreases and which is conducted in a plurality of wastewater treatment plant processing tanks in cooperation with a gas supply system to supply oxygen-containing gas bubbles to, and dissolve oxygen in, the wastewater in at least one plant processing tank, and a control system comprising at least one flow control element to supply an increasing and decreasing flow of oxygen-containing gas through the gas supply system into the wastewater in the at least one plant processing tank and at least one gas collection member and gas detector to provide off-gas data correlative with changing amounts of one or more gases in offgas from the wastewater, a controller to process the off-gas data and cause the flow control element to increase and decrease the flow of oxygen-containing gas into the wastewater in said tank or tanks, and wherein the control system is programmed to tend to maintain a positive DO level in at least a portion of the at least one tank characterized in that the apparatus comprises at least one DO (dissolved oxygen) detector to provide, in the control system, DO data reflecting DO levels in the wastewater and the controller contains or has access to code which, with the aid of the offgas data and DO data, the controller defines varying control values comprising separate or combined requirements control values correlative with the repeatedly fluctuating need for oxygen-containing gas flow to support the biological process and DO control values that are correlative with such varying positive or negative adjustments of oxygen-containing gas flow sufficient to cause the wastewater DO levels to move toward, return to or be maintained at a target value, the at least one flow control element is connected with the controller to receive and act in response to control signals in the control system based at least in part on said control values to supply an increasing and decreasing flow of oxygen-containing gas through the gas supply system into the wastewater in the at least one plant processing tank.

13. Apparatus according to claim 12 wherein the controller contains or has access to code which, with the aid of performance data, the controller defines performance values that are correlative with additional oxygen-containing gas flow adjustments needed to compensate for varying ability of the gas supply system to dissolve oxygen in the wastewater.

14. Apparatus according to claim 12 comprising a tank having a wastewater inlet and an outlet, and the control system includes DO measuring devices at first and second locations in the tank.

15. Apparatus according to claim 12 wherein the at least one tank is divided into at least two sections by a baffle and/or other form of length divider, at least one of said sections having upstream and downstream halves.

16. Apparatus according to claim 12 wherein the gas collection member is positioned in an upstream half of a tank or tank section to receive offgas representing gas from bubbles that have not been dissolved in the wastewater.

17. Apparatus according to claim 12 wherein the gas collection member is positioned in an upstream half of a tank or tank section to receive offgas representing gas from bubbles that have not been dissolved in the wastewater.

18. Apparatus according to claim 12 wherein the control system includes at least two DO probes respectively positioned in upstream and downstream halves of a tank or tank section for gathering data with respect to DO levels.

19. Apparatus according to claim 12 wherein the control system includes at least two DO probes respectively positioned in upstream and downstream halves of a tank or tank section for gathering data with respect to DO levels.

20. Apparatus according to claim 12 comprising a tank or tank section having an upstream end, and at least portions of the gas collection member and of a DO probe are positioned within an interval of about the first 20% of tank length, measured from the upstream end.

* * * * *